United States Patent
Berger et al.

(10) Patent No.: US 10,681,168 B2
(45) Date of Patent: Jun. 9, 2020

(54) INTERNET-WIDE PROFESSIONAL IDENTITY PLATFORM

(71) Applicant: Microsoft Technology Licensing, LLC, Redmond, WA (US)

(72) Inventors: Erran Berger, San Francisco, CA (US); Aaron Bronzan, San Francisco, CA (US); Vinodh Jayaram, Fremont, CA (US); Avery Randolph Moon, Redwood Shores, CA (US); Elliot Shmukler, Palo Alto, CA (US); Bradley Scott Mauney, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/193,220

(22) Filed: Feb. 28, 2014

(65) Prior Publication Data
US 2014/0245189 A1    Aug. 28, 2014

Related U.S. Application Data

(60) Provisional application No. 61/770,709, filed on Feb. 28, 2013.

(51) Int. Cl.
| | | |
|---|---|---|
| *G06F 3/048* | (2013.01) | |
| *H04L 29/08* | (2006.01) | |
| *G06Q 30/02* | (2012.01) | |
| *G06Q 50/00* | (2012.01) | |

(52) U.S. Cl.
CPC ............ *H04L 67/306* (2013.01); *G06F 3/048* (2013.01); *G06Q 30/02* (2013.01); *G06Q 50/01* (2013.01)

(58) Field of Classification Search
CPC .............................. G06F 3/048; H04L 67/306
See application file for complete search history.

(56) References Cited

U.S. PATENT DOCUMENTS

| | | | |
|---|---|---|---|
| 8,682,926 B1 | 3/2014 | Braytenbaum et al. | |
| 2010/0082683 A1* | 4/2010 | Law | G06Q 10/10 707/784 |
| 2010/0169363 A1 | 7/2010 | Gaedcke | |
| 2010/0299276 A1* | 11/2010 | Shahine | G06Q 50/01 705/319 |
| 2012/0192258 A1 | 7/2012 | Spencer et al. | |

(Continued)

OTHER PUBLICATIONS

Moo Nam Ko et al "Socia- Networks Connect Services" Issue No. 08—Aug. (2010 vol. 43) ISSN: 0018-9162 pp. 37-43 (Year: 2010).*

(Continued)

*Primary Examiner* — Xuyang Xia
(74) *Attorney, Agent, or Firm* — Schwegman Lundberg & Woessner, P.A.

(57) ABSTRACT

According to various exemplary embodiments, professional identity content associated with a member of a social network service is identified, based on a network search for online content that contains online content attributes that match member profile attributes included in member profile data associated with the member. Thereafter, a display of a prompt is generated, via a user interface in a device, wherein the prompt invites the member to update a member profile page associated with the member, based on the identified professional identity content.

20 Claims, 21 Drawing Sheets

(56) References Cited

U.S. PATENT DOCUMENTS

| | | | |
|---|---|---|---|
| 2012/0303703 A1* | 11/2012 | Richter | G06Q 50/01 709/204 |
| 2013/0007596 A1* | 1/2013 | Vandermolen | G06F 17/30867 715/234 |
| 2013/0031176 A1 | 1/2013 | Shih et al. | |
| 2013/0031487 A1 | 1/2013 | Olsen et al. | |
| 2013/0198307 A1 | 8/2013 | Ruetschi et al. | |
| 2014/0033081 A1* | 1/2014 | Fernandez | G06F 17/30867 715/760 |
| 2014/0129942 A1* | 5/2014 | Rathod | H04N 21/44222 715/720 |
| 2014/0245188 A1 | 8/2014 | Berger et al. | |

OTHER PUBLICATIONS

"U.S. Appl. No. 14/192,201, Advisory Action dated Nov. 17, 2016", 3 pgs.

"U.S. Appl. No. 14/192,201, Examiner Interview Summary dated Oct. 27, 2016", 3 pgs.

"U.S. Appl. No. 14/192,201, Final Office Action dated Aug. 25, 2016", 20 pgs.

"U.S. Appl. No. 14/192,201, Response filed Jun. 8, 2016 to Non Final Office Action dated Mar. 10, 2016", 13 pgs.

"U.S. Appl. No. 14/192,201, Response filed Oct. 25, 2016 to Final Office Action dated Aug. 25, 2016", 12 pgs.

"U.S. Appl. No. 14/192,201, Examiner Interview Summary dated Feb. 7, 2018", 3 pgs.

"U.S. Appl. No. 14/192,201, Non Final Office Action dated Oct. 3, 2017", 12 pgs.

"U.S. Appl. No. 14/193,220, Response filed Feb. 5, 2018 to Non Final Office Action dated Oct. 3, 2017", 11 pgs.

Moo, Nam, et al., "Social-networks connect services", IEEE, (2010), 37-43.

"Final Office Action Issued in U.S. Appl. No. 14/192,201", dated Apr. 5, 2018, 16 Pages.

"Non Final Office Action Issued in U.S. Appl. No. 14/192,201", dated Mar. 10, 2016, 17 Pages.

\* cited by examiner

NEW COMPUTER SYSTEM

IEEE JOURNAL

December 1, 2012

Jane Doe

Abstract:

⌐500

UNITED STATES PATENT

Jane Doe          U.S. Patent No. 1,234, 567

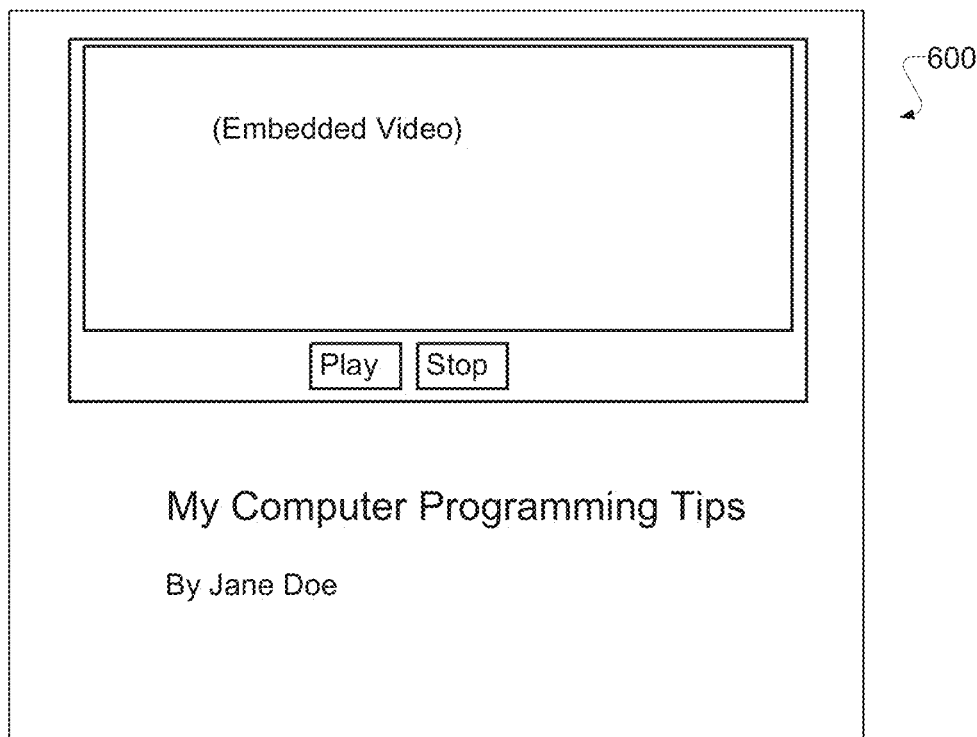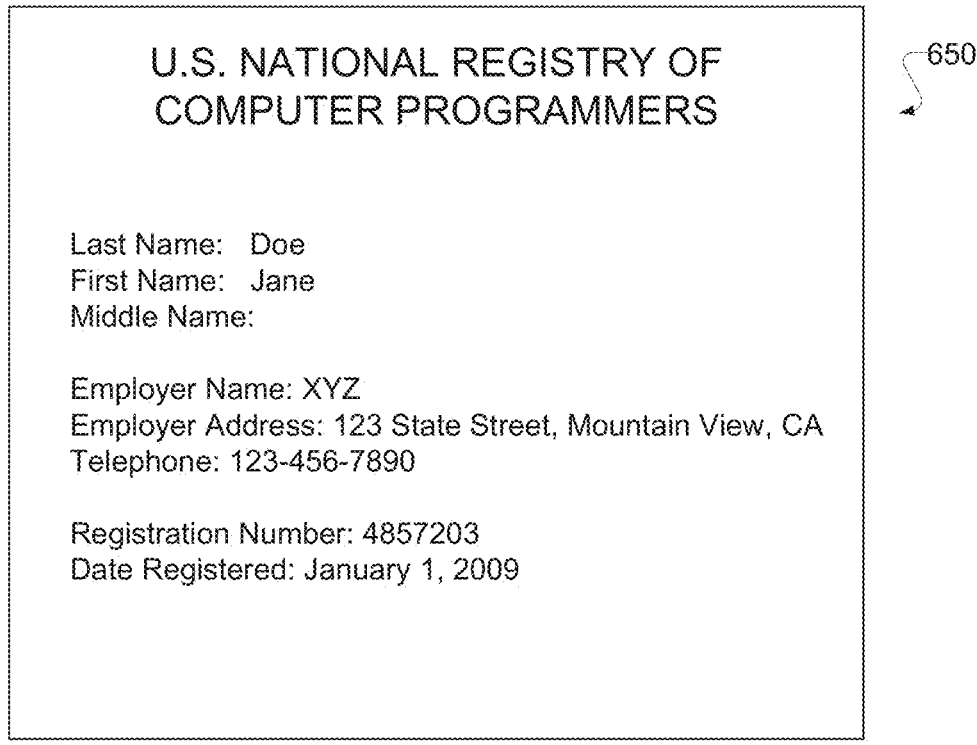
Fig. 6

| Member Profile Attribute | Keywords/Synonyms |
|---|---|
| Doctor | doctor, medicine, physician, medical school,... |
| Lawyer | lawyer, law, attorney, esquire, law school,... |
| Computer programmer | computers, programmer, engineer, computer science... |
| Sales representative | sale, representative, marketing, advertising, products,... |

*Fig. 12*

| Member Segment | Known Professional Identity Websites |
|---|---|
| Doctor | www.doctor-registry.com, www.medicinejournal.com,... |
| Lawyer | www.lawyer-registry.com, www.lawyerjournal.com,... |
| Computer programmer | www.compprog-registry.com, www.compprogjournal.com,... |
| Sales representative | ... |
| Generic/Default | www.doctor-registry.com, www.lawyer-registry.com, www.compprog-registry.com,... |
| Education Position... | ... |
| Skill... | ... |

| Member Profile Attribute | Professional Identity Websites | | | | | | |
|---|---|---|---|---|---|---|---|
| | Website A | Website B | Website C | Website D | Website E | Website F | Website G |
| Doctor | 100k | 200k | 1k | 1k | 2k | 10k | 15k |
| Lawyer | 1k | 1k | 100k | 200k | 10k | 15k | 2k |
| Computer programmer | 1k | 1k | 10k | 15k | 2k | 100k | 200k |
| ⋮ | ⋮ | ⋮ | ⋮ | ⋮ | ⋮ | ⋮ | ⋮ |

Fig. 14

INTERNET-WIDE PROFESSIONAL IDENTITY PLATFORM

This application claims the priority benefit of U.S. Provisional Application No. 61/770,709, filed Feb. 28, 2013, which is incorporated herein by reference.

TECHNICAL FIELD

The present application relates generally to electronic data and, in one specific example, to a professional identity content management system.

BACKGROUND

Online social and professional networking websites are becoming increasingly popular, with many such websites boasting millions of active members. Each member of the networking website is able to upload an editable member profile page to the networking website. The member profile page may include various information about the member, such as the member's biographical information, photographs of the member, and information describing the member's employment history, education history, skills, experience, activities, and the like. Such member profile pages of the networking website are viewable by, for example, other members of the networking website.

BRIEF DESCRIPTION OF THE DRAWINGS

Some embodiments are illustrated by way of example and not limitation in the figures of the accompanying drawings in which:

FIG. 5 illustrates examples of professional identity content, according to various embodiments.

FIG. 6 illustrates examples of professional identity content, according to various embodiments.

FIG. 12 illustrates an example of member profile attribute data, according to various embodiments.

FIG. 13 illustrates an example of professional content website information, according to various exemplary embodiments.

FIG. 14 illustrates information that identifies, for each of various member profile attributes, a number of times a member having that attribute has posted professional identity content on a particular website, according to various exemplary embodiments.

DETAILED DESCRIPTION

Example methods and systems for improving member profiles are described. In the following description, for purposes of explanation, numerous specific details are set forth in order to provide a thorough understanding of example embodiments. It will be evident, however, to one skilled in the art that the present invention may be practiced without these specific details.

Figure 1:
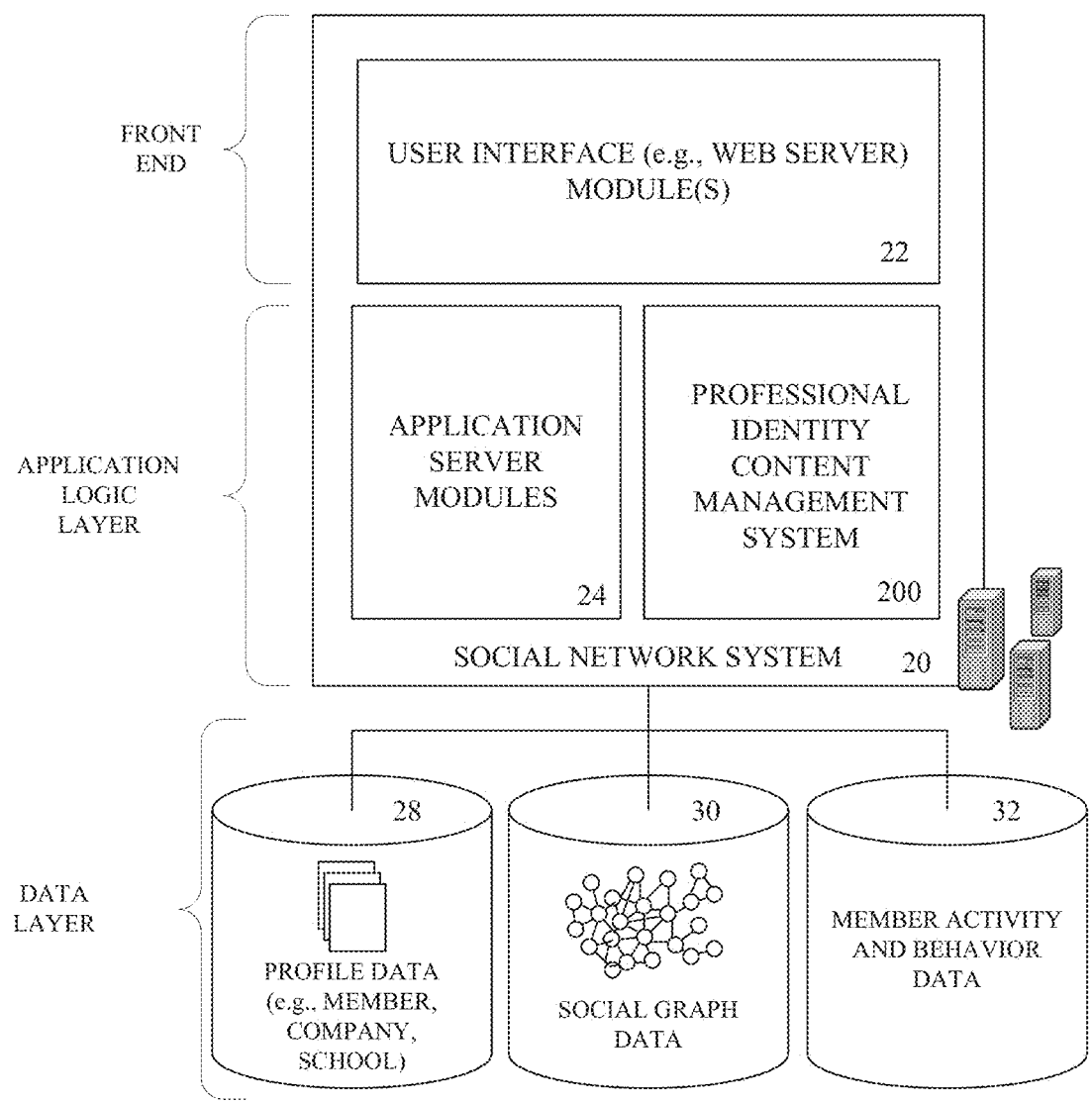
FIG. 1 is a block diagram showing the functional components of a social networking service, consistent with some embodiments of the invention.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

With some embodiments, the social network system 20 includes what is generally referred to herein a professional identity content management system 200. The professional identity content management system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that enables facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
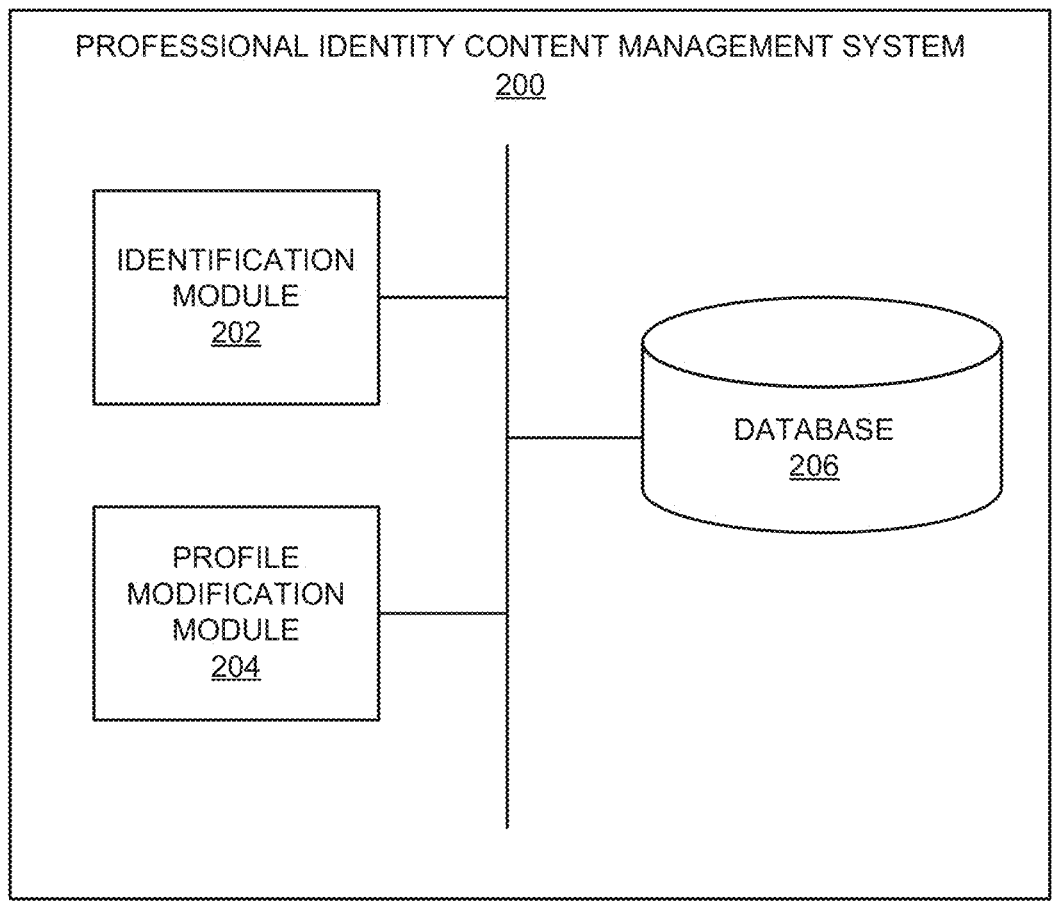
FIG. 2 is a block diagram of an example system, according to various embodiments.

Turning now to FIG. 2, a professional identity content management system 200 includes an identification module 202, a profile modification module 204, and a database 206. The modules of the professional identity content management system 200 may be implemented on a single device such as a member profile improvement device, or on separate devices interconnected via a network. The aforementioned member profile improvement device may correspond to, for example, a client machine or application server.

According to various embodiments described herein, the professional identity content management system 200 is configured to find professional identity content (e.g., articles, publications, professional biographies, multimedia work product content including photos, slideshows, and videos, professional certifications, professional registrations, professional awards, blogs, presentations, responses in group discussion, forums, blogs, etc.) associated with a member of a social network service (e.g., LinkedIn.com), and to prompt the member as to whether they would like to include this professional identity content in their member profile page (e.g., their LinkedIn member profile page). Thereafter, the professional identity content may be included in their member profile. Thus, their member profile page (e.g., their LinkedIn member profile page) may become their Internet-wide repository for professional content and a "go-to" representation of their Internet-wide professional identity.

According to various embodiments, the professional identity content management system 200 may find the professional identity content by accessing member profile attributes of the member (e.g., user name, e-mail address, location, education, experience, skill, etc.), and crawling or searching for webpages that include professional identity content having associated owner information (e.g., user name, e-mail address, etc.) that matches the aforementioned member profile attributes.

According to various embodiments, the professional identity content management system 200 may narrow down the list of websites to search for, based on various member profile attributes, such as education, experience, or skill. For example, if the member has a particular experience position (e.g., the member is a physician or a lawyer), then the professional identity content management system 200 may search for professional identity content from among a known set of professional identity content websites that tend to host professional identity content for users having that same experience position or a similar experience position. As another example, if the member has a particular education position (e.g., the member attended a photography school or a physiotherapy school), then the professional identity content management system 200 may search for professional identity content from among a known set of professional identity content websites that tend to host professional identity content for users having that same education position or a similar education position. As another example, if the member has a particular skill (e.g., JAVA, HTML, C++, etc.), then the professional identity content management system 200 may search for professional identity content from among a known set of professional identity content websites that tend to host professional identity content for users having that same skill or a similar skill.

According to various embodiments, the professional identity content management system 200 may explicitly ask the member to identify their professional identity content posted on other webpages, and may then include that professional identity content into their member profile page (e.g., their LinkedIn member profile page).

Figure 3:
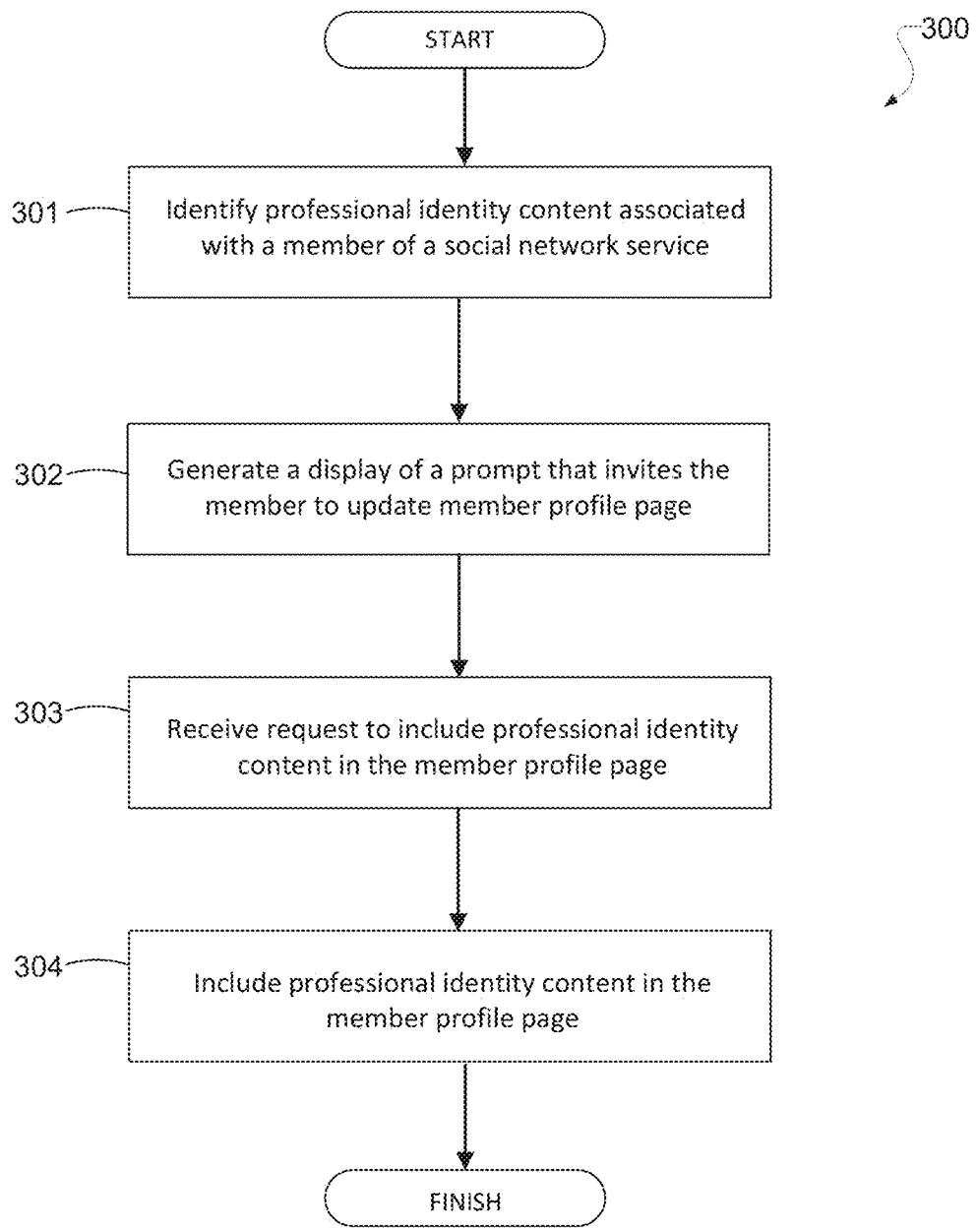
FIG. 3 is a flowchart illustrating an example method, according to various embodiments.

FIG. 3 is a flowchart illustrating an example method 300, according to various embodiments. The method 300 may be performed at least in part by, for example, the professional identity content management system 200 illustrated in FIG. 2 (or an apparatus having similar modules, such as a client machine or application server). In operation 301, the identification module 202 identifies professional identity content associated with a member of a social network service. For example, the identification module 202 may identify the professional identity content based on a network search for online content that contains online content attributes that match member profile attributes included in member profile data associated with the member. In operation 302, the profile modification module 204 generates a display, via a user interface in a device, of a prompt that invites the member to update a member profile page associated with the member, based on the professional identity content identified in operation 301. In operation 303, the profile modification module 204 receives user input of a request to include the professional identity content in the member profile page. Finally, in operation 304, the profile modification module 204 includes the professional identity content in the member profile page. Each of the aforementioned operations operation 301-operation 304, and each of the aforementioned modules of the professional identity content management system 200, will now be described in greater detail.

Figure 4:
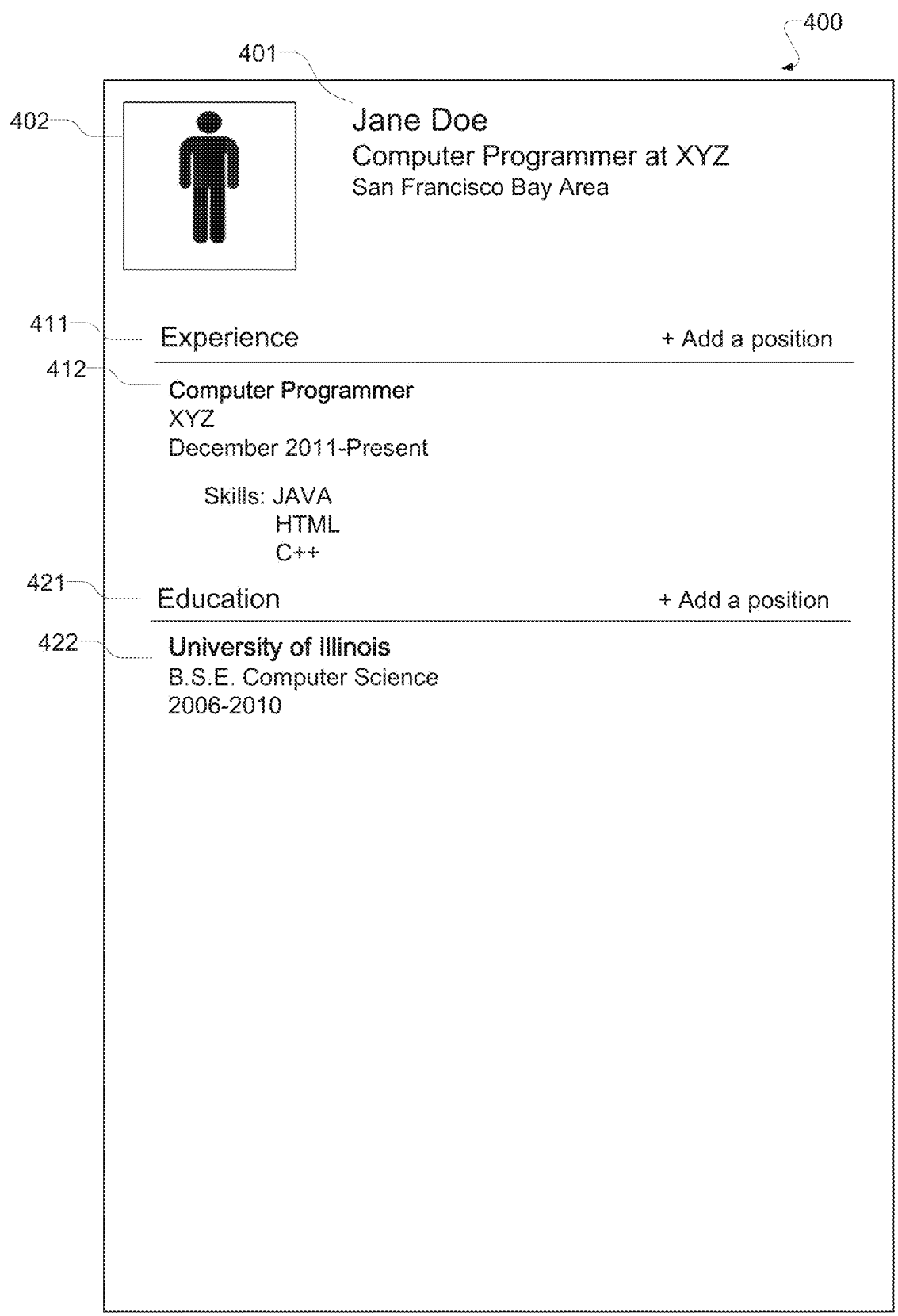
FIG. 4 illustrates an example of a member profile page, according to various exemplary embodiments.

Referring back to FIG. 3, in operation 301, the identification module 202 identifies professional identity content associated with a member of a social network service. The member of the social network service may be associated with a member profile page hosted by the social network service. An example of a member profile page 400 of a member (e.g., a LinkedIn® page of a member "Jane Doe") is illustrated in FIG. 4. As seen in FIG. 4, the member profile page 400 includes identification information 401, such as the member's name ("Jane Doe"), the member's current employment position, ("Computer Programmer at XYZ"), and geographic address/location information ("San Francisco Bay Area"). The member's profile page 400 also includes a photo area 402 for displaying a photograph of the member. Further, the member profile page 400 includes various sections (also known as fields). For example, member profile page 400 includes an experience section 411 including listings of experience positions (e.g., employment/volunteer experience position 412) and skills of the member, and an education section 421 including listings of educational credentials of the member (e.g., university degree or diploma 422 earned or currently being earned by the member).

Note that the member profile page 400 is merely exemplary, and while the member profile page 400 includes certain sections or fields (e.g., experience sections and educations sections), it is apparent that these sections or fields may be supplemented or replaced by other sections or fields (e.g., a general portfolio section/field, an art portfolio section/field, a music portfolio section/field, a photography portfolio section/field, a multimedia section/field, and so forth). Those skilled in the art will understand that a member profile page may include other information, such as various identification information (name, username, email address, geographic address, networks, location, phone number, etc.), education information, employment information, resume information, skills, experience, activities, group membership, images, photos, preferences, news, status, links or URLs on the profile page, and so forth.

The member profile pages of the social network service (e.g., LinkedIn.com) may correspond to member profile web pages hosted by a remote web server associated with the social network service. Such member profile web pages may be accessible through a network (e.g., the Internet) with use of a web browser of a client device that accesses a specific Uniform Resource Locator (URL) reference link corresponding to each member profile web page. For example, when a user of a client device provides the appropriate user commands to a browser application operating on the client device, the browser application transmits a request to the appropriate URL through a network (e.g., the Internet), and the remote web server transmits a response to the browser application of the client device, where the response includes code corresponding to the user profile page (e.g., HTML code, HTML5 code, XHTML code, JavaScript code, etc.). Thereafter, the browser application interprets the received code, and renders the code as a visual webpage that may be displayed by a display unit of the client device (e.g., a display screen or display monitor), so that the member profile web page may be viewed by the user of the client device. Such aspects of a browser application accessing web pages hosted by remote web servers through a network are understood by those skilled in the art, and hence shall not be described in further detail in the interests of brevity.

Referring back to operation 301 in FIG. 3, the identification module 202 is configured to identify professional identity content associated with a member of a social network service. As described herein, professional identity content refers to any content available online that is in some way related to the professional identity of a member, including content related to a current or previous profession, occupation, career, job, experience position, academic position, or skill associated with a member. For example, the professional identity content may include or describe work product generated by the member, or describe the member's experiences, credentials, certifications, awards, accomplishments, endorsements, recommendations, achievements, and so on. Examples of professional identity content include: Multimedia work product content (e.g., any work product content generated by the member during a term of employment or education, where the work product content may include text content, image content, video content, audio content, slide show content, etc.), biography information (e.g., an online law firm bio of a lawyer working at a firm, or an online medical practice bio of a medical practitioner working at a medical practice), professional certification information or professional registration information (e.g., bar registration information for an attorney, or medical certification/license information for a medical practitioner), professional award information (e.g., professional awards received by a member during a term of education or employment), article publication information (e.g., patents or articles published by the member), blog information (e.g. professional blogs), question-and-answer information (e.g. questions and answers posted on a webpage, Internet forum, bulletin board, blog, question and answer service/blog, personal website, etc.), and presentation information (e.g., presentations given by the member in the form of a word document, PowerPoint slides, a slideshow, etc.). The professional identity content may be hosted by professional identity content websites which may be distinct from the aforementioned social network service. Non-limiting examples of professional identity content websites that host professional identity content include: SlideShare®, YouTube®, Vimeo®, Scribd®, Facebook®, Twitter®, Tumblr®, Instagram®, Flickr®, Google® Docs, Google® Picasa, Dropbox®, Wordpress®, Skydrive®, Box®, Behance®, Pinterest®, Movable Type®, TypePad®, Blogger®, SoundCloud®, Posterous®, SmugMug®, SquareSpace®, Github®, Evernote®, LinkedIn® Answers, Quora®, StackOverflow®, About.me, MySpace®, Dribbble®, and so on. Many of the aforementioned professional identity content websites display content in the form of a "feed", where content is displayed in chronological order (with the most recent content being displayed at the top of the feed). Note that while the various embodiments throughout refer to "professional" identity content, it should be understood that the embodiments of this disclosure are not limited to content generated only as a result of paid/compensated positions; professional identity content may also include content arising out of education positions, amateur positions, hobbies, interests, clubs, extracurricular activities, etc.

FIG. 5 and FIG. 6 illustrates examples of various types of professional identity content 500, 550, 600, and 650, associated with the member Jane Doe, the same member associated with the member profile page 400 illustrated in FIG. 4. For example, the professional identity content item 500 corresponds to article publication information (e.g., an article, publication, or a journal article or publication authored by the member), which may be posted on a webpage or a website accessible via a network (e.g., the Internet) such as a personal website or blog, or a website of a professional journal, society, organization, or club, etc. As another example, the professional identity content item 550 corresponds to patent information (e.g., a U.S. patent for which the member is an inventor), which may be posted on a webpage or a website accessible via a network (e.g., the Internet), such as a personal website or blog, or a website of a society, organization (e.g., the U.S. Patent and Trademark Office), or club, etc. As another example, the professional identity content item 600 corresponds to tutorial or a presentation authored by the member, which may be posted on a webpage or a website accessible via a network (e.g., the Internet), such as a personal website or blog, or a website of a professional journal, society, organization, or club, etc. As another example, the professional identity content item 650 corresponds to registration information of the member (e.g., the member's registration as a computer programmer), which may be posted on a webpage or a website accessible via a network (e.g., the Internet), such as a personal website or blog, or a website of a professional journal, society, organization, or club, etc.

According to various embodiments, the professional identity content management system 200 is configured to find the professional identity content (e.g., the professional identity content items in FIG. 5 and FIG. 6) associated with a member of the social network service (e.g., the member Jane Doe, see FIG. 4), by using member profile attributes of the member (e.g., user name, e-mail address, sex, gender, location, experience, education, skills, etc.) and crawling or searching for professional identity content having associated online content attributes and/or owner information (e.g., user name, e-mail address, etc.) that matches the aforementioned member profile attributes.

For example, as illustrated in FIG. 4, the member profile page 400 associated with the member Jane Doe identifies the name of the member as Jane Doe. Although not illustrated in FIG. 4, the member profile page 400 may also identify the e-mail address of the member Jane Doe. Thus, the identification module 202 may identify professional identity content, such as professional identity content items 500, 550, 600, and 650 illustrated in FIG. 5 and FIG. 6, by crawling webpages accessible via a network (such as the Internet) for professional identity content associated with the name and e-mail address of Jane Doe. For example, the identification module 202 may access a list of all known professional identity content websites accessible via a network (such as the Internet). Thereafter, the identification module 202 may crawl through webpages associated with these professional identity content websites, searching for any of the webpages associated with a particular member name or email address. The identification module 202 may examine the HTML code associated with each of the webpages being crawled, in order to determine if any of these webpages include HTML code associated with data or metadata corresponding to the name or email address of the member Jane Doe.

As described above, the identification module 202 may crawl through all the data, metadata, and information associated with known professional identity content websites. Examples of professional identity content websites include SlideShare®, YouTube®, Vimeo®, Scribd®, Facebook®, Twitter®, Tumblr®, Instagram®, Flickr®, Google® Docs, Google® Picasa, Dropbox®, Wordpress®, Skydrive®, Box®, Behance®, Pinterest®, Movable Type®, TypePad®, Blogger®, SoundCloud®, Posterous®, SmugMug®, SquareSpace®, Github®, Evernote®, LinkedIn® Answers, Quora®, StackOverflow®, About.me, MySpace®, Dribbble®, and so on. If the professional identity content management system 200 has an appropriate access agreement with various websites, the professional identity content management system 200 may also crawl through all the data, metadata or information associated with private professional identity content webpages of the users of the professional identity content websites. The identification module 202 can access the professional identity content websites to access identity information or user profile information regarding the registered users of the professional identity content websites from information available in registered user profiles. Any publically available social media identity information regarding the members may be obtained from other social media or online sources as well, and may be utilized to identify professional identity content associated with that social media identity information. Professional identity content websites may expose identity information in some sort of application programming interface (API) that is accessible by the identification module 202. Thus, the identification module 202 may retrieve user profile information of the professional identity content webpages from application programming interfaces (APIs) that are exposed by the respective professional identity content websites.

Referring back to FIG. 3, after the identification module 202 identifies professional identity content (e.g., professional identity content items 500, 550, 600, 650 illustrated in FIG. 5 and FIG. 6) corresponding to a member of a social network service (e.g., the member Jane Doe illustrated in FIG. 4) in operation 301, then, in operation 302, the profile modification module 204 generates a display of a prompt that invites the member update their member profile page based on the identified professional identity content. The prompt may be displayed via a user interface in a device, such as a mobile device (e.g., smart phone, tablet, etc.) associated with the member.

Figure 7:
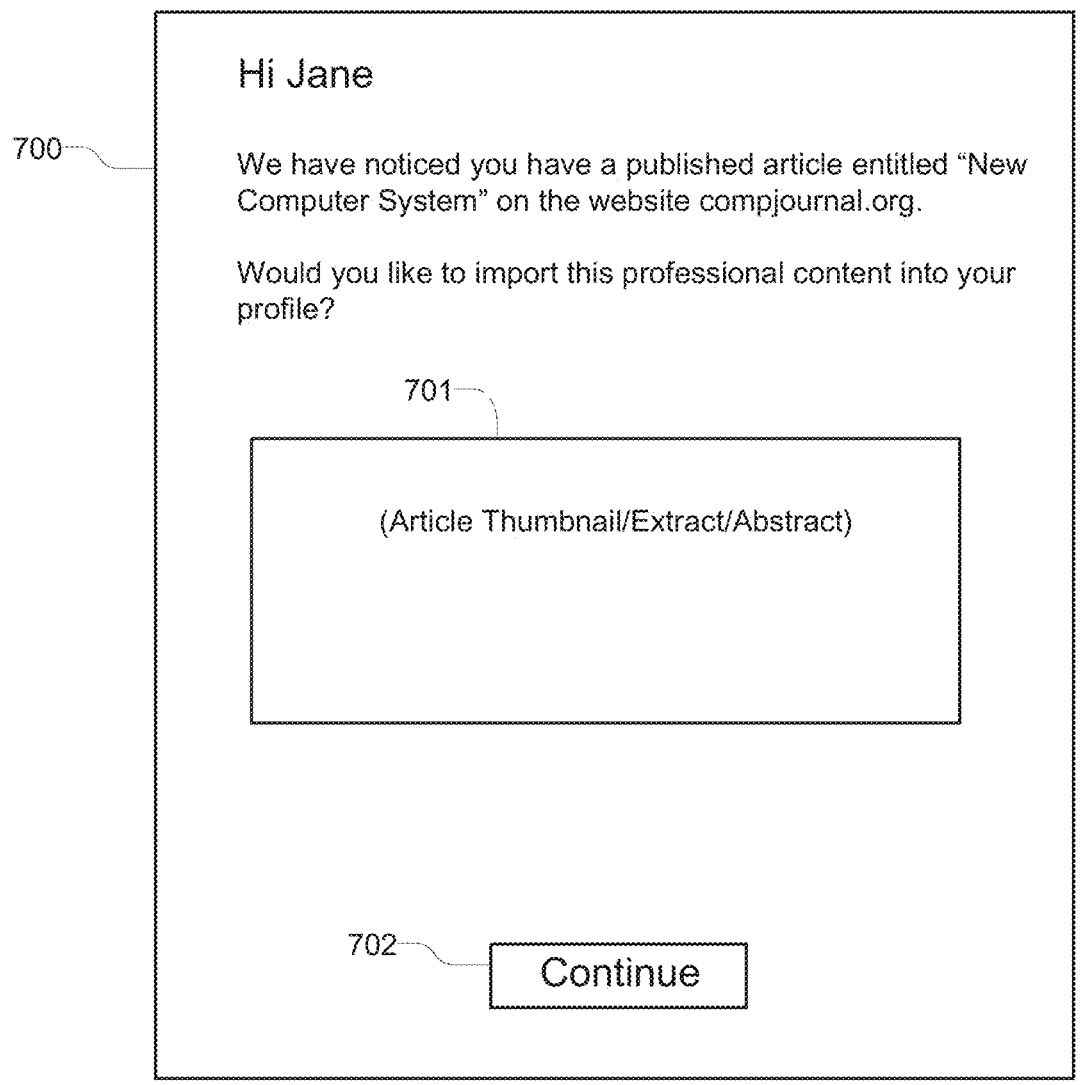
FIG. 7 illustrates an example of a prompt, according to various embodiments.

FIG. 7 illustrates a prompt 700 that identifies professional identity content identified by the professional identity content management system 200 (e.g., the article 500 illustrated in FIG. 5). Moreover, the prompt 700 invites the member Jane Doe to include the identified professional identity content (e.g., the professional identity content 500 illustrated in FIG. 5) into their member profile page 400. As illustrated in FIG. 7, the prompt 700 may actually include a representation 701 (e.g. a thumbnail, extract, quote, abstract, screenshot, etc.) of the relevant professional identity content item. The prompt 700 illustrated in FIG. 7 may be superimposed over the member profile page 400 of the member illustrated in FIG. 4. However, the prompt 700 may be communicated to the member in other ways. For example, the prompt 700 may be transmitted to the member Jane Doe in the form of an e-mail, text message (e.g., a Short Message Service or SMS text message, or a Multimedia Messaging Service or MMS text message), an instant message, chat request, and so on, as understood by those skilled in the art.

Referring back to FIG. 3, in operation 303, the profile modification module 204 receives user input of a request to include the professional identity content in the member profile page. For example, the profile modification module 204 may detect that the member Jane Doe has selected the "Continue" button 702 in the prompt 700 illustrated in FIG. 7. Although not illustrated, after the member selects the continue button 702, the profile modification module 204 may display a member profile completion webpage that includes instructions for updating the member profile page to include the professional identity content. For example, after the member selects the continue button 702, the profile modification module 204 may request the member to enter various authentication information (e.g., username, password, etc.) associated with webpages hosting their identified professional identity content items.

Finally, in operation 304 in FIG. 3, the profile modification module 204 includes the professional identity content in the member profile page of the member. For example, the profile modification module 204 may include/import the professional identity content item 500 illustrated in FIG. 5 in the member profile page 400 of the user Jane Doe illustrated in FIG. 4. The insertion/importing process may include fetching content from a website hosting the professional identity content and populating this content into the member profile page of the user.

As described above, after the member selects the continue button 702 in FIG. 7, the profile modification module 204 may request the member to enter various authentication information (e.g., username, password, etc.) associated with websites hosting the identified professional identity content. The profile modification module 204 may utilize this authentication information to automatically access and fetch the content by crawling through all the data, metadata, and information associated with websites hosting the professional identity content of the member. If the professional identity content management system 200 has an appropriate access agreement with various professional identity content websites, the professional identity content management system 200 may also crawl through all the data, metadata or information associated with private professional identity content webpages of the users of the professional identity content websites. Professional identity content websites may expose content in the professional identity content web pages via some sort of application programming interface (API) that is accessible by the profile modification module 204. Thus, the profile modification module 204 may retrieve the content of the professional identity content webpages from application programming interfaces (APIs) that are exposed by the respective professional identity content websites.

Figure 8:
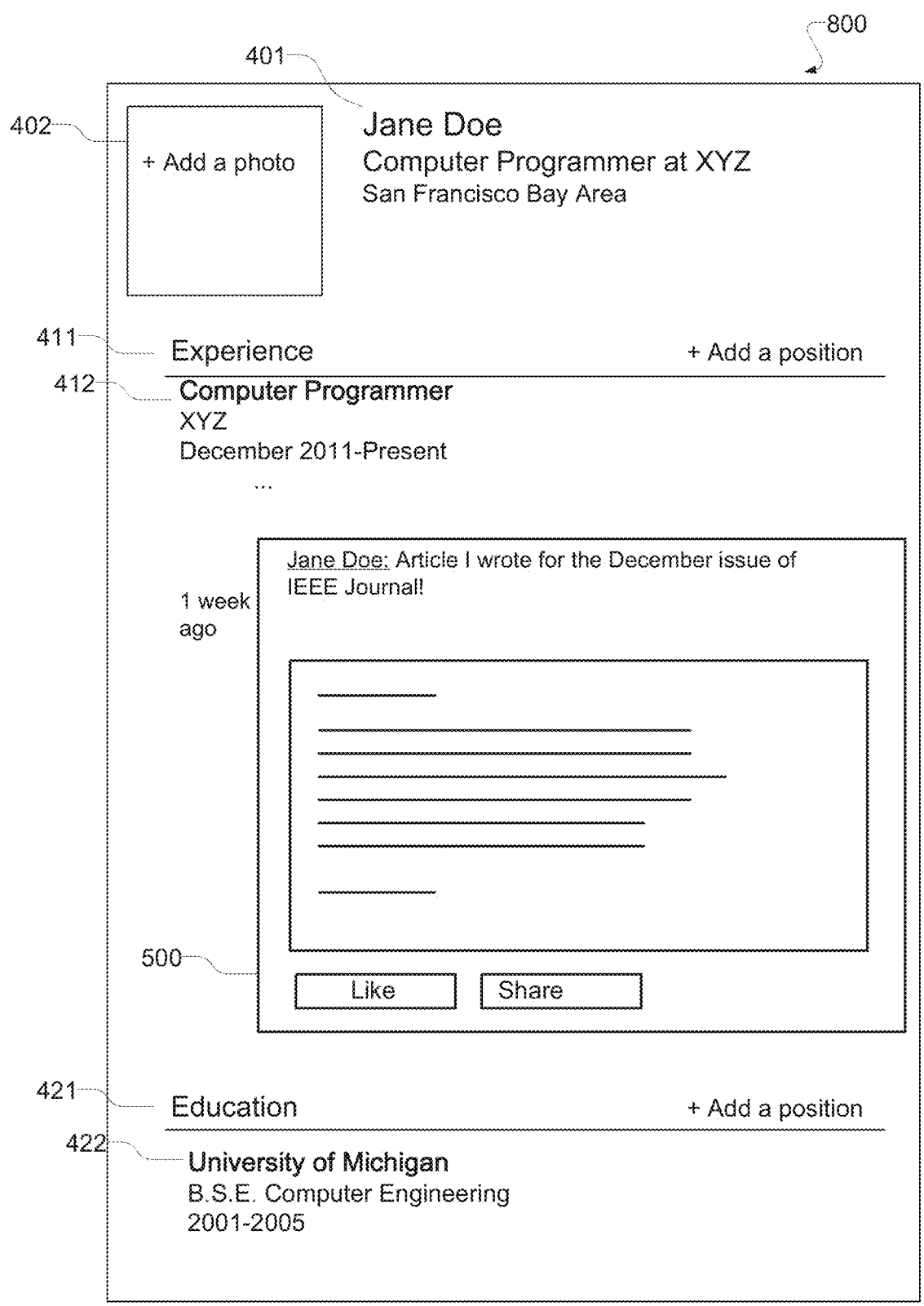
FIG. 8 illustrates an example of a member profile page including professional identity content, according to various embodiments.

FIG. 8 illustrates a member profile page 800 substantially similar to the member profile page 400 of the user Jane Doe illustrated in FIG. 4. As illustrated in FIG. 8, the professional identity content 500 of the member Jane Doe (see FIG. 5) has been included in the member profile page 800 of the member Jane Doe.

According to various exemplary embodiments, after the profile modification module 204 identifies and fetches professional identity content from a particular website, the profile modification module 204 may be configured to periodically access this website in order to check if there are any updates to the professional identity content (or if any new professional identity content has been posted, etc.). The interval of the periodic checking may be defined by the member via a user interface displayed by the profile modification module 204.

As described above, in various exemplary embodiments, the professional identity content management system 200 is configured to find the professional identity content (e.g., the professional identity content 500 in FIG. 5) associated with a member of the social network service (e.g., the member Jane Doe, see FIG. 4), by using member profile attributes of the member (e.g., user name, e-mail address, IP address, sex, age, professional experience, education, skill, location, etc.) and searching or crawling for professional identity content with associated attributes and/or owner information (e.g., user name, e-mail address, etc.) that matches the aforementioned member profile attributes.

Figure 9:
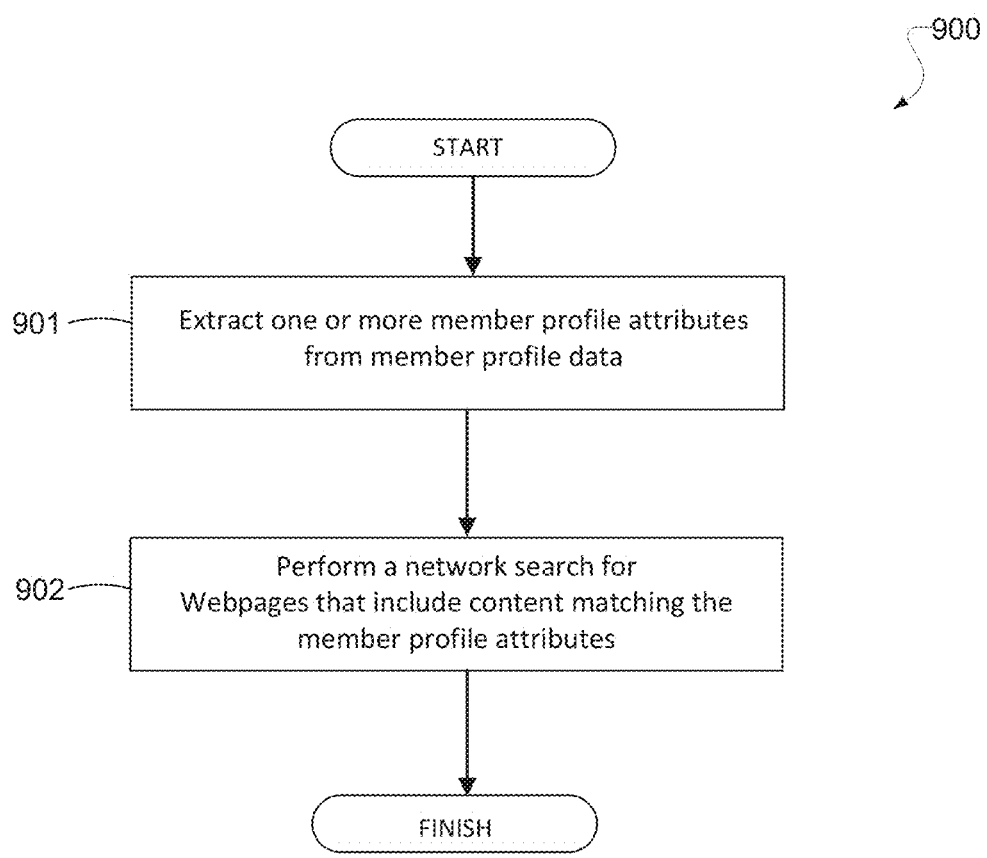
FIG. 9 is a flowchart illustrating an example method, according to various embodiments.
Figure 10:
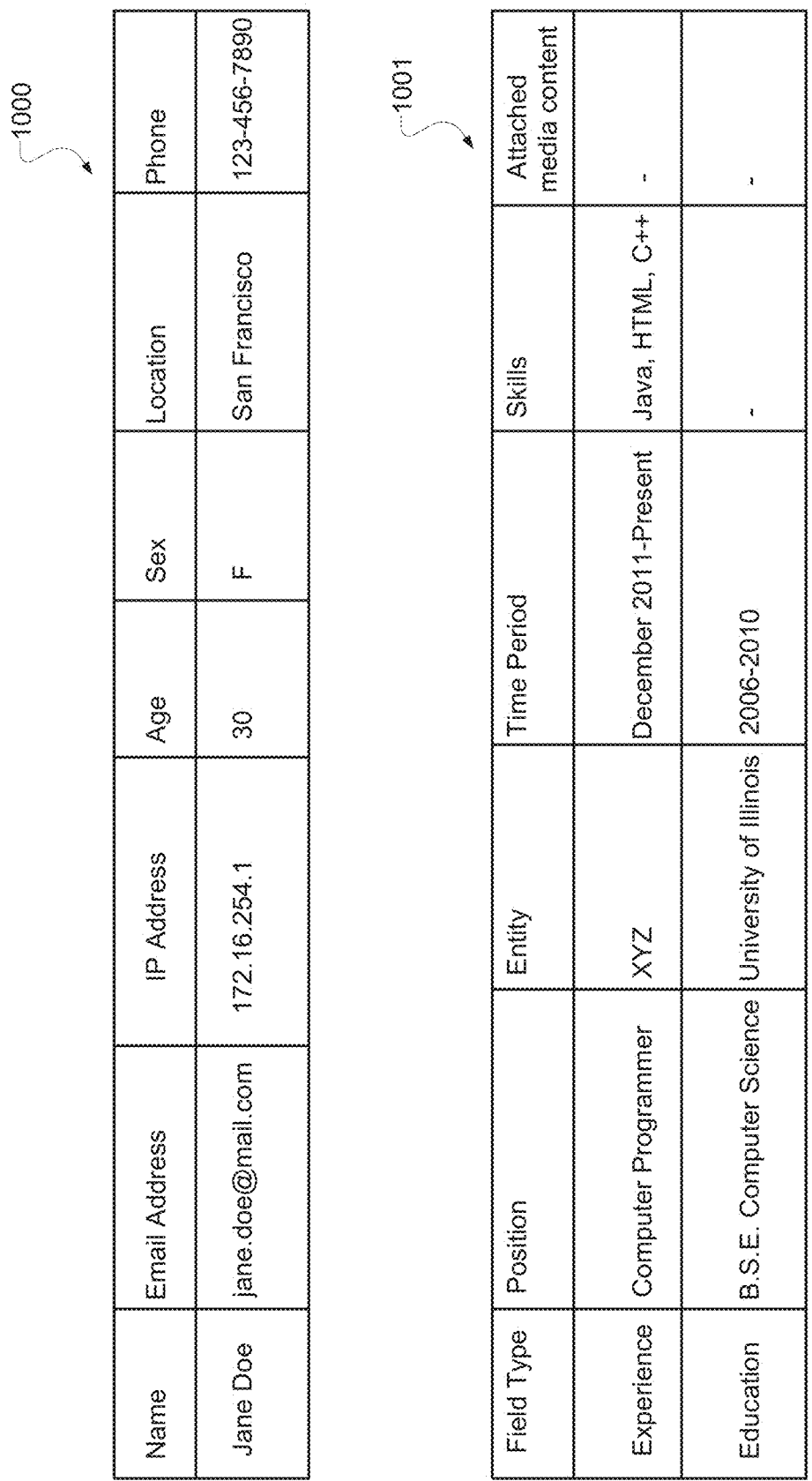
FIG. 10 illustrates an example of member profile data, according to various embodiments.

For example, FIG. 9 is a flowchart illustrating an example method 900, according to various embodiments. The method 900 may be performed at least in part by, for example, the professional identity content management system 200 illustrated in FIG. 2 (or an apparatus having similar modules, such as a client machine or application server). In operation 901, the identification module 202 extracts one or more member profile attributes from member profile data associated with the member of the social network service. For example, FIG. 10 illustrates a member profile data 1000 and 1001 corresponding to the information included in the member profile page 400 of the user Jane Doe (see FIG. 4). The member profile data 1000 and 1001 may be stored in, for example, the database 206 illustrated in FIG. 2. The member profile data 1000 includes, for example, name, e-mail address, IP address, age, sex, location, phone, experience positions, education positions, skills, etc. The member profile data for a member may include more information than is included in the corresponding member profile page, since the member profile page displays information for public viewing, whereas the member profile data includes all public and private information associated with the account of that member (e.g., information supplied by the member when the member signed up for the account). Thus, in operation 901 in FIG. 9, the identification module 202 may extract various member profile attributes, such as name or e-mail address, from the member profile data of the member Jane Doe.

In operation 902, the identification module 202 performs a network search for professional identity content associated with content and/or owner attributes that match the extracted member profile attributes. For example, the identification module 202 may crawl a network (such as the Internet) for webpages hosting professional identity content associated with the name or email address of the member Jane Doe. For example, according to various embodiments the identification module 202 may access a list of all known webpages hosting professional identity content that are accessible via a network (such as the Internet). Thereafter, the identification module 202 may crawl through these professional identity content websites, searching for any of the webpages associated with a particular member name or e-mail address (or any other one of the extracted member profile attributes). For instance, the identification module 202 may examine the HTML code associated with each of the webpages, in order to determine if any of the webpages include HTML code associated with data or metadata corresponding to the name or e-mail address, or other member profile attributes of the member Jane Doe (which were extracted in operation 901).

According to various embodiments, the professional identity content management system 200 may narrow down the list of webpages to search for, based on various member profile attributes, such as education, experience, or skills. For example, if the member has a particular experience position (e.g., the member is a physician or a lawyer), then the professional identity content management system 200 may search for professional identity content from among a known set of professional identity content websites that tend to host professional identity content for users having that same experience position or similar experience positions. As another example, if the member has a particular education position (e.g., the member attended a photography school or a physiotherapy school), then the professional identity content management system 200 may search for professional identity content from among a known set of professional identity content websites that tend to host professional identity content for users having that same education position or similar education positions. As another example, if the member has a particular skill (e.g., JAVA, HTML, C++, etc.), then the professional identity content management system 200 may search for professional identity content from among a known set of professional identity content websites that tend to host professional identity content for users having that same skill or a similar skill.

Figure 11:
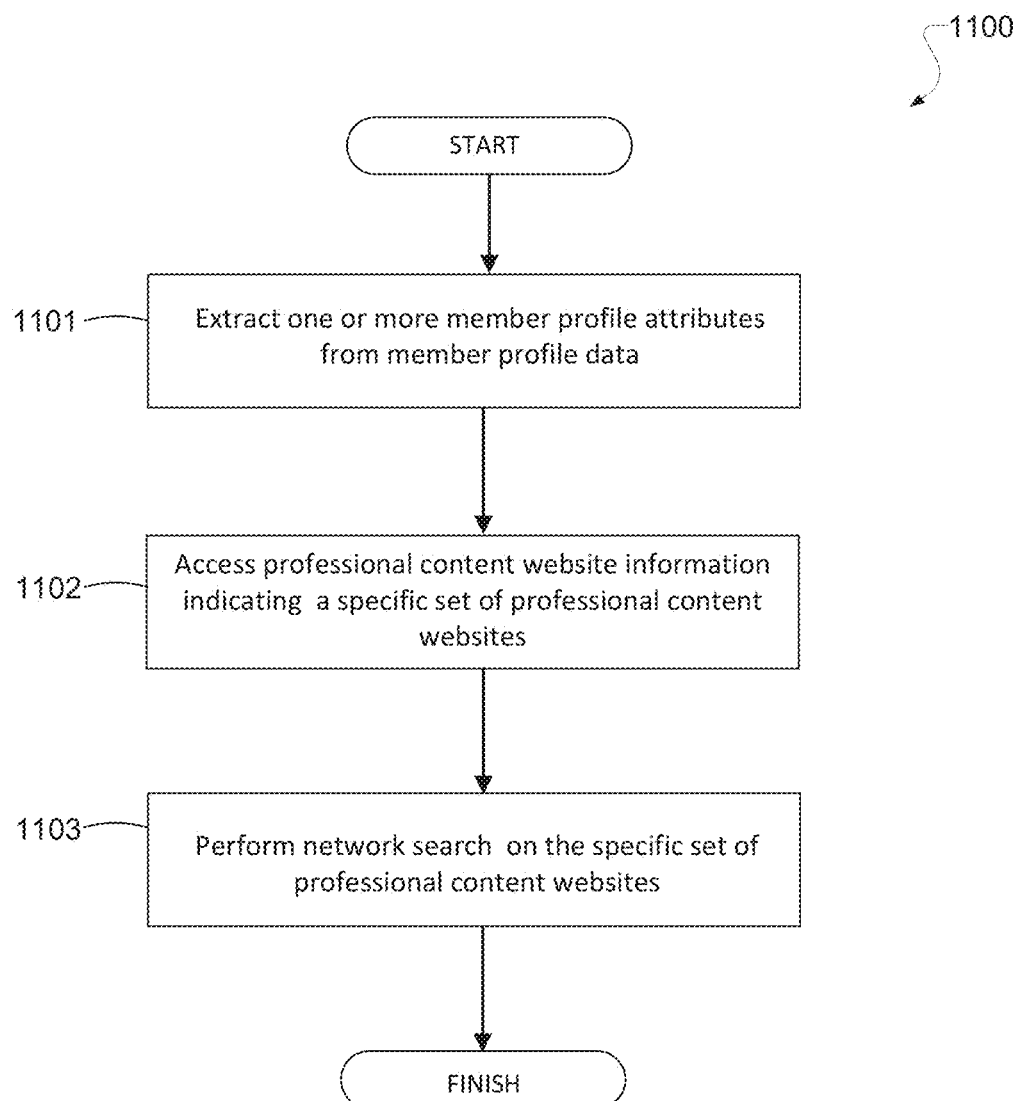
FIG. 11 is a flowchart illustrating an example method, according to various embodiments.

For example, FIG. 11 is a flowchart illustrating an example method 1100, according to various embodiments. The method 1100 may be performed at least in part by, for example, the professional identity content management system 200 illustrated in FIG. 2 (or an apparatus having similar modules, such as client machine or application server). In operation 1101, the identification module 202 extracts one or more member profile attributes from member profile data associated with the member of the social network service. Examples of member profile attributes include name, e-mail address, IP address, age, sex, location, phone, experience positions, education positions, skills, etc.

In operation 1102, the identification module 202 accesses professional content website information indicating that a specific set of professional identity content websites are associated with a specific one of the member profile attributes. The specific member profile attribute may correspond to, for example, a professional experience position, an education position, a skill, etc. For example, with reference to the member profile data 1001 illustrated in FIG. 10, the identification module 202 will determine that the member Jane Doe has an experience position as a "computer programmer". (FIG. 12 illustrates member profile attribute information indicating synonyms or keywords that may be included in the member profile data that may correspond to a standard member profile attribute, such as an experience position of "computer programmer"). Based on this member profile attribute of experience position or education position, the identification module 202 may consult professional content website information 1300 illustrated in FIG. 13, which identifies, for each of a number of member profile attributes (such a skill, education position or experience positions such as doctor, lawyer, computer programmer, etc.), a number of known professional identity content websites that host professional identity content. For example, for the member profile attribute "computer programmer", the known professional identity content websites may include www.compprog-registry.com, www.compprog-journal.com, etc., as seen in FIG. 13.

In operation 1103 in FIG. 11, the identification module 202 performs a network search for professional identity content associated with account owner attributes that match the extracted member profile attributes, where the search is performed on the specific set of professional identity content websites identified in the operation 1102. For example, the identification module 202 may crawl the specific set of professional identity content websites identified in operation 1102 for professional identity content associated with the name or e-mail of the member. For instance, the identification module 202 may examine the HTML code associated with each of the webpages associated with the specific set of professional identity content websites, in order to determine if any of the webpages include HTML code associated with data or metadata corresponding to the name or e-mail address of the member Jane Doe (which was extracted in operation 1101).

In some embodiments, the professional content website information 1300 in FIG. 13 may be generated by the professional identity content management system 200 based on an analysis of professional content that has been posted by the member base of an online social network service. For example, as described above, the professional identity content management system 200 may crawl a network for professional content associated with members of a social network service. Accordingly, by crawling and discovering professional content associated with various members, and by analyzing the member profile attributes of these various members, the professional identity content management system 200 may detect trends indicating that, for example, members having particular member profile attributes tend to post professional identity content on certain websites, or vice versa. For example, the professional identity content management system 200 may determine that, for example, a statistically significant portion of members having education position "B.S.E in Computer Engineering" tend to have patent applications published by a website (e.g., Google® Patents, USPTO website, etc.), and a statistically significant portion of members having experience position "lawyer" tend to have an attorney biography posted on an attorney biography service (e.g., Martindale Hubbell®), and a statistically significant portion of members have a skill "surgery" tend to have a certification accessible via a website (e.g., American College Of Surgeons), and so on. The professional identity content management system 200 may then utilize this information to generate the aforementioned professional content website information 1300 in FIG. 13.

In some embodiments, the professional identity content management system 200 may determine a trend that people having a particular member profile attribute (e.g., the job title of "lawyer") tend to post professional identity content on some websites and not others, by tracking or accounting the number of occurrences where a member having a particular member profile attribute (e.g., the job title of "lawyer") has posted professional identity content on each of various websites. For example, the system 200 may select a specific member, search the Internet for professional identity content associated with that specific member, and keep a record of the website(s) where that professional content was located as well as all the member profile attributes of that member (e.g., location, job title, employer, education, alumni, skills, endorsements, etc.). The system 200 may repeat this process for a plurality of other members (e.g., the entire member base of a social network service, or a subset thereof such as a random sample of members, members having an attribute in common, etc.). Accordingly, the system 200 may generate information 1400 illustrated in FIG. 14, which identifies, for each of various member profile attributes (such a skill, education position, or experience position such as doctor, lawyer, computer programmer, etc.), the number of times a member having that attribute has posted professional identity content on a particular website (e.g., website A, website B, website C, etc.). For example, as illustrated in FIG. 14, members having the member profile attribute of the job title "lawyer" have posted professional identity content on the website A 1000 times, website B 1000 times, website C 100,000 times, and so on. Accordingly, the system 200 may analyze the information 1400 in order to determine that members having the member profile attribute of the job title "doctor" tend to post professional identity content on website A and website B far more than on other websites, whereas members having the member profile attribute of the job title "lawyer" tend to post professional identity content on website C and website D far more than on other websites, whereas members having the member profile attribute of the job title "computer programmer" tend to post professional identity content on website E and website F far more than on other websites, and so on. The system 200 may apply thresholds or any known statistical analysis or machine learning technique in order to select the most popular websites for finding professional identity content associated with each member profile attribute, and thus the system 200 may generate the professional content website information 1300 in FIG. 13.

In some embodiments, the method 300 described in FIG. 3 may be a synchronous process, in that a network search for professional identity content associated with a user is performed, a match for professional identity content associated with the is identified, the matching professional identity content is presented to the user, and then the user may update their profile. In other embodiments, one or more of the operations in the method 300 in FIG. 3 may be performed asynchronously and/or may be composed of several asynchronous processes. As one example, the method 300 may comprise several asynchronous processes including, 1) Crawling, 2) Matching, and 3) Suggesting, are described in more detail below, using the example of lawyer web bio pages as a form of professional identity content. In the Crawling step, the system 200 crawls all lawyer bio web pages available on the Internet and indexes each lawyer bio based on some query-able criteria (name, location, etc.). In the Matching step, the system 200 queries all members of a social network service determined to be lawyers (e.g., based on member profile attributes such as job title, employer, education, etc.) against the aforementioned index. For any match found between a lawyer bio web page in the index and a member of the social network service, the system 200 updates a suggestions database that stores all possible suggestions of professional identity content for each member of the social network service (e.g., to indicate the lawyer bio webpage associated with the lawyer member, in this example). In the Suggesting step, when a member logs into the social network service, the system 200 queries the aforementioned suggestions database and presents any suggestions stored in association with that member's information to the member. For example, the system 200 may present a prompt to the member suggesting that they add their lawyer bio page to their profile, where the prompt may include a button to select in order to add the lawyer bio page to their profile with "one click". Accordingly, the member may add that professional identity content of the lawyer bio web page to their profile by clicking on the suggestion prompts (consistent with various embodiments herein). Thus, it is understood that the crawling step may occur well before the matching step, which may occur well before the suggesting step or before the user logs into the online social network service. Alternatively, in some embodiments, the matching process described above may instead involve the system 200 querying each entry in the index against an existing member index of all members of the online social network service. For any matches found for an individual in the index and a member of the online social network, the system 200 may update a suggestions database that stores all possible suggestions for each member (e.g., to indicate the matching record in the index for the matching member).

According to various exemplary embodiments, the system 200 (or a similar system, such as a profile attribute inference/determination system) is configured to access known member profile attributes (e.g., name, e-mail address, IP address, sex, age, professional experience, education, location, etc.) included in member profile data of a member of a social network service, and determine or infer, based on the known member profile attributes, a predicted member profile attribute associated with a member profile field in a member profile page. Thereafter, the system 200 may generate a display, via a user interface in a device, of a prompt that invites the member to update a member profile field of the member profile page, based on the predicted or inferred member profile attribute.

Figure 15:
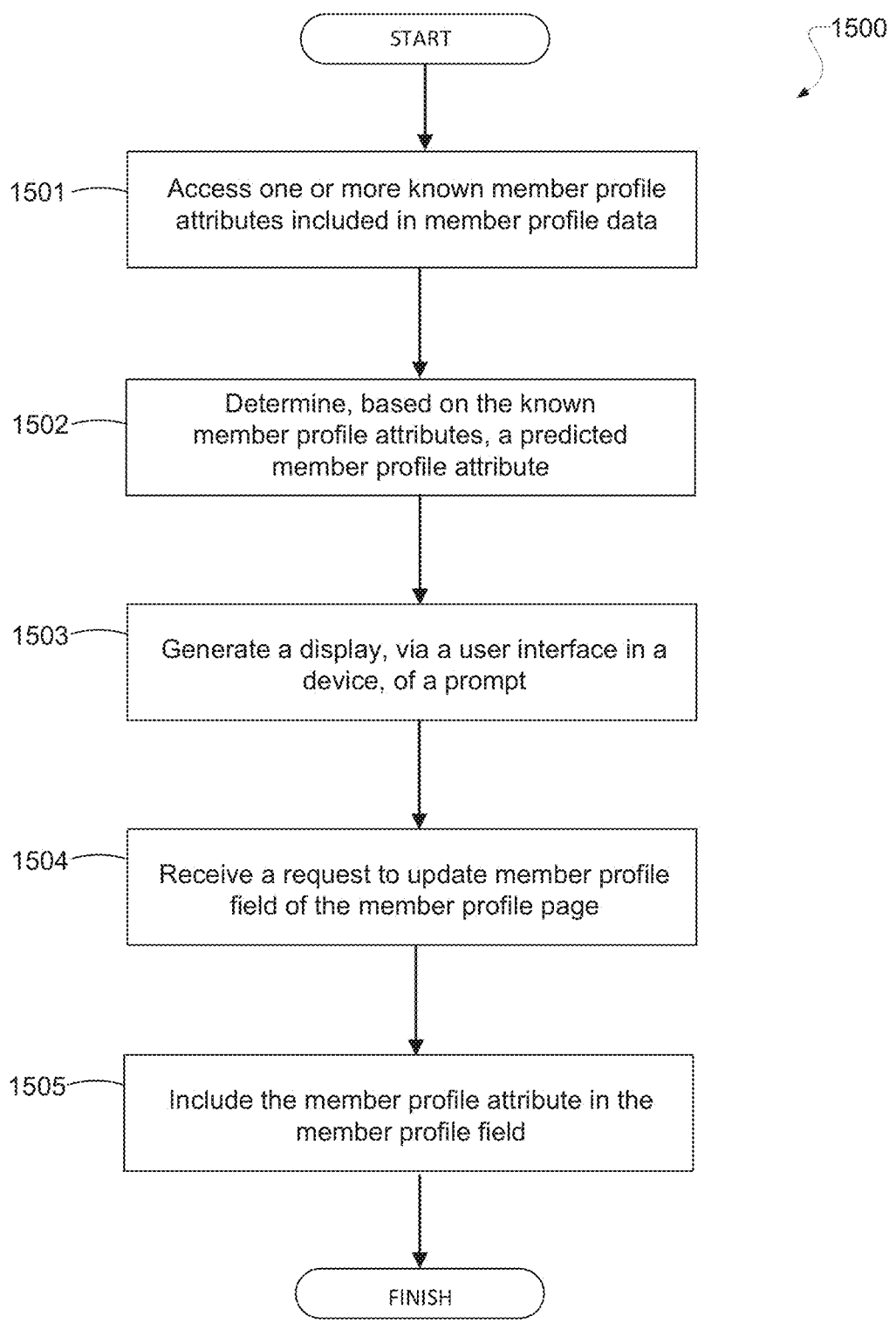
FIG. 15 is a flowchart illustrating an example method, according to various embodiments.
Figure 16:
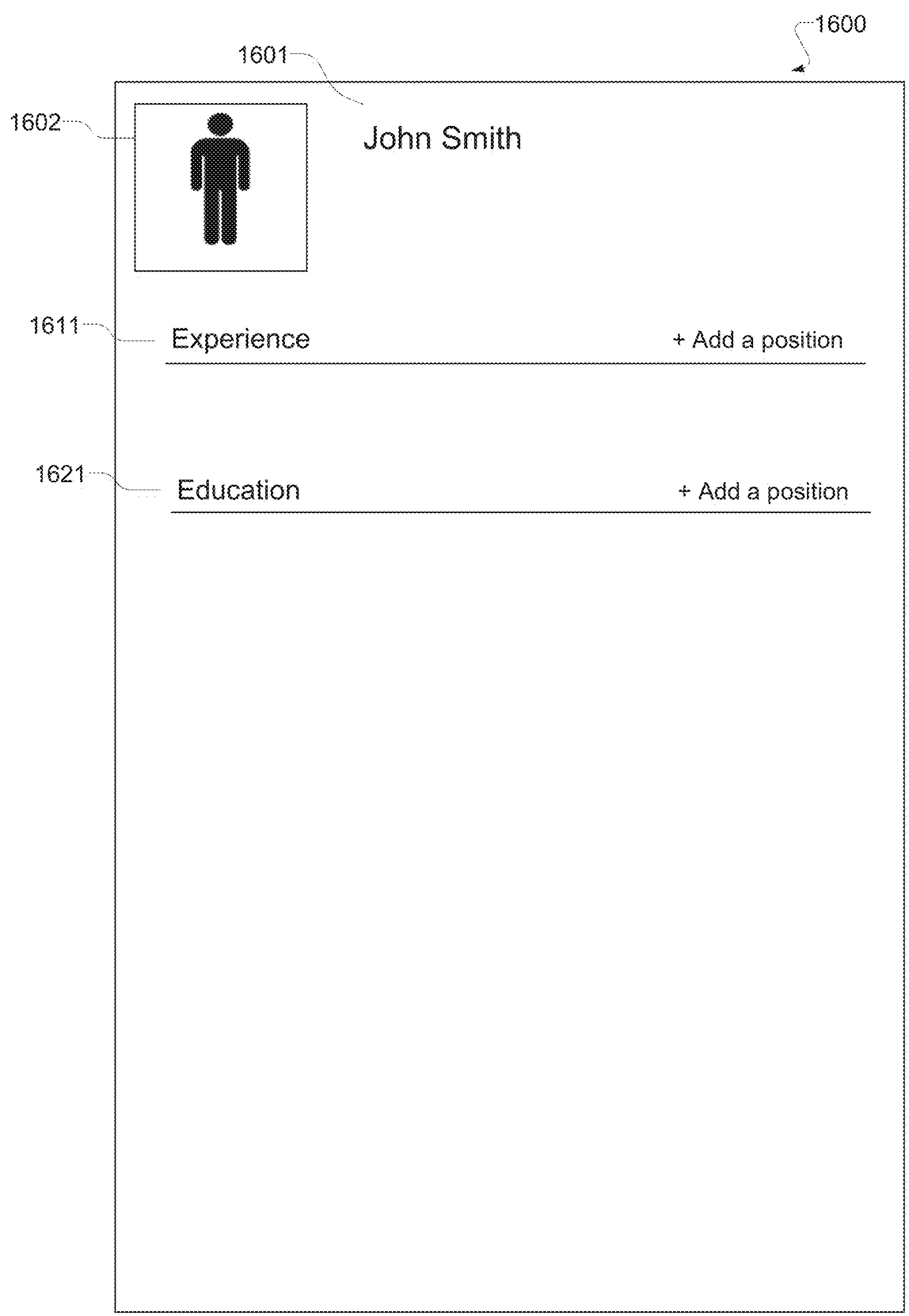
FIG. 16 illustrates an example of a member profile page, according to various exemplary embodiments.
Figure 17:
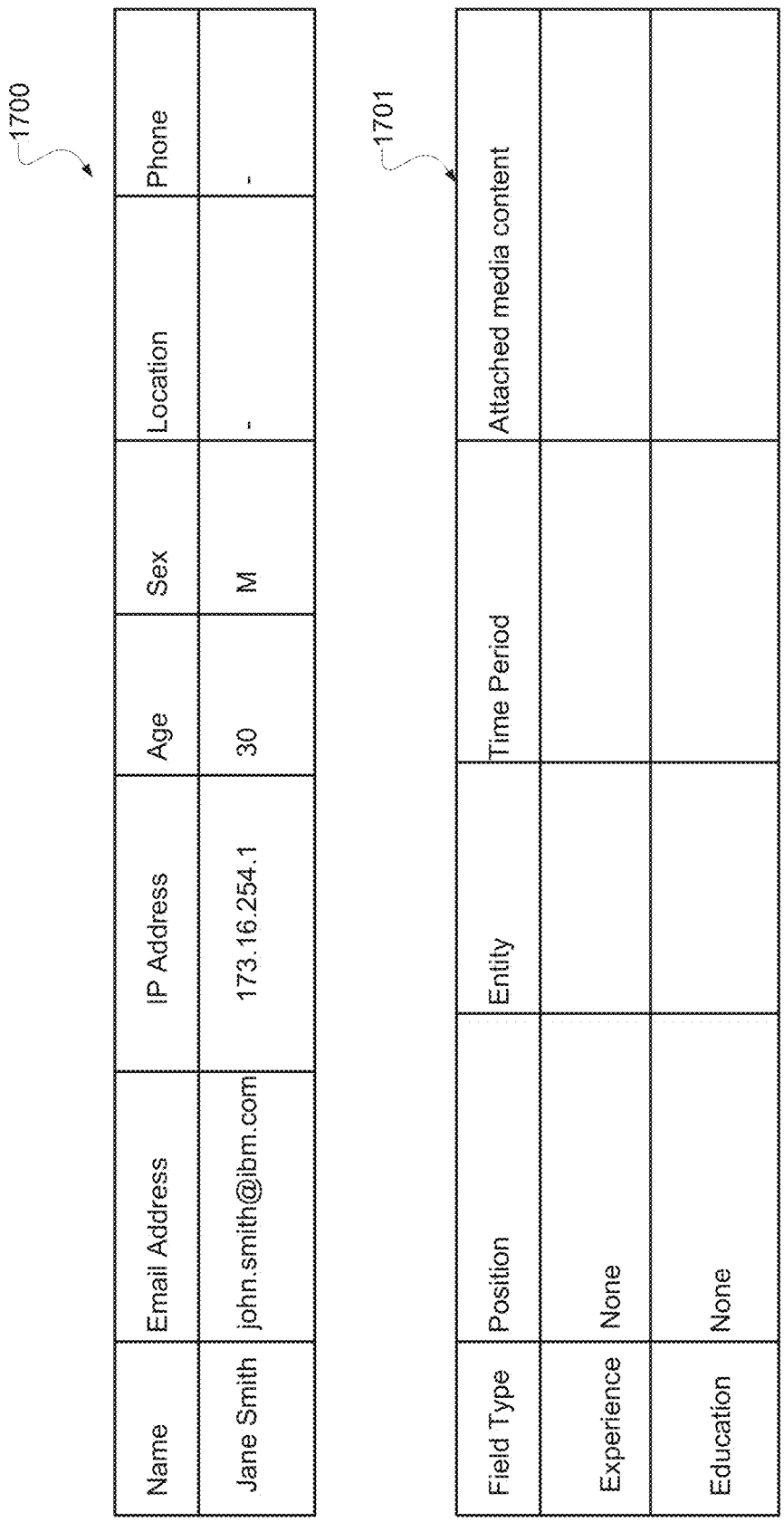
FIG. 17 illustrates an example of member profile data, according to various embodiments.

For example, FIG. 15 is a flowchart illustrating an example method 1500, according to various embodiments. The method 1500 may be performed at least in part by, for example, the system 200 illustrated in FIG. 2 (or an apparatus having similar modules, such as a client machine or an application server). In 1501, the identification module 202 accesses one or more known member profile attributes included in member profile data corresponding to a member of a social network service. The social network service may host a member profile page that is generated based on the member profile data. For example, FIG. 16 illustrates a member profile page 1600 of the user John Smith. The member profile page 1600 is similar to the member profile page 400 illustrated in FIG. 4, and callouts 1601, 1602, 1611, and 1621 are similar to callouts 401, 402, 411, and 421, as described above. Exemplary member profile data 1700 and 1701 corresponding to the user John Smith and the member profile page 1600 is illustrated in FIG. 17. As seen in FIG. 17, the member profile data 1700 and 1701 includes only a limited amount of member profile attributes of the member John Smith. In particular name, e-mail address, IP address, age, and sex is known, but various other member profile attributes are unknown. This may be the case because, for example, the member John Smith has only recently joined the social network service and has only provided limited information for the setup of their member profile page. Thus, in 1501, the identification module 202 may access these known member profile attributes included in the member profile data 1700, 1701.

In 1502, the identification module 202 determines or infers, based on the known member profile attributes, a predicted member profile attribute associated with a member profile field in the member profile page. For example, according to various embodiments, the identification module 202 may analyze the e-mail address of the member in order to determine a likely location, experience position or education position of the member. For example, if the e-mail address of the member ends with "@IBM.com", then the identification module 202 may determine that the member is currently an employee of IBM and resides near a campus of IBM. As another example, if the e-mail address of the member ends with "@standford.edu", then the identification module 202 may determine that the member is currently an employee, faculty, staff, or a student at Stanford University, and currently resides near a campus of Stanford University. Thus, the identification module 202 may compare properties of the e-mail address (e.g., domain name) against a list or lookup table identifying a plurality of e-mail properties (e.g., domain name) and corresponding organizations, academic institutions, employers, etc.

According to another exemplary embodiment, the identification module 202 may analyze the IP address associated with the member in order to determine a likely location, experience position or education position of the member. The aforementioned IP address stored in the member profile data 1700 may correspond to, for example, an IP address of a device previously used (e.g., first used or last used) to login to the member's account on the social network service. The identification module 202 may compare this IP address against a lookup table identifying a plurality of IP addresses and/or a location associated with these addresses. The identification module 202 may then cross-reference the location corresponding to the IP address with the known locations of businesses, employers, educational institutions, cities, states, countries, etc., in order to infer predicted member profile attributes such as location, experience position, and education position. For example, if the IP address associated with the member corresponds to a device location or computer network location at the campus of the IBM company, then the identification module 202 may determine that the member is currently an employee of IBM and resides near a campus of IBM. As another example, if the IP address associated with the member corresponds to a device location or computer network location at the campus of the Stanford University, then the identification module 202 may determine that the member is currently an employee, faculty, staff, or a student at Stanford University, and currently resides near a campus of Stanford University.

According to various exemplary embodiments, if the identification module 202 accesses a member profile attribute corresponding to a particular education position or experience position (e.g., computer programmer), then the identification module 202 may infer member profile attributes such as a set of skills (e.g., computer programming) based on this education position or experience position. Similarly, if the identification module 202 accesses a member profile attribute corresponding to a particular skill (e.g., computer programming), then the identification module 202 may infer member profile attributes such as an experience position or education position (e.g., computer programmer) based on these skills.

According to another exemplary embodiment, the identification module 202 may infer the predicted member profile attributes based on information other than the member profile data. For example, the identification module 202 may access professional identity content as described in various embodiments in this disclosure, and can infer various member profile attributes such as education position, experience position, skills, etc., based on this professional identity content. For example if the member has previously posted answers to technical computer programming questions on a question-and-answer service such as Quora or StackOverflow, then the identification module 202 may access this professional identity content using various techniques described elsewhere in this disclosure. Thereafter, the identification module 202 may infer, based on this professional identity content, that the user has skills in the computer science field, and/or has an education/experience position in the computer science field.

The aforementioned inferences may be performed by comparing the known member profile attributes of the member with the member profile data of other members having similar member profile attributes. For example, with reference to the member profile data in FIG. 17, the identification module 202 may access various member profile attributes (e.g., e-mail address domain, the IP address, the age, and the sex, of the member John Smith). The identification module 202 then may access comparative member profile data of other members having similar member profile attributes to the aforementioned member profile attributes (e.g., similar email address domain, IP address, age, sex). The identification module 202 may then analyze the rest of the comparative member profile data in order to determine the most common member profile attributes among these similar members. For example, the identification module 202 may determine that, based on the comparative member profile data, members that have similar member profile attributes to the member John Smith (e.g., e-mail address domain, IP address, age, sex), tend to have an education position of engineering at Stanford University, or tend to have an experience position as an engineer at IBM, or tend to be located in the San Francisco Bay Area, and so on. Thus, these member profile attributes may be inferred for the member John Smith.

Figure 18:
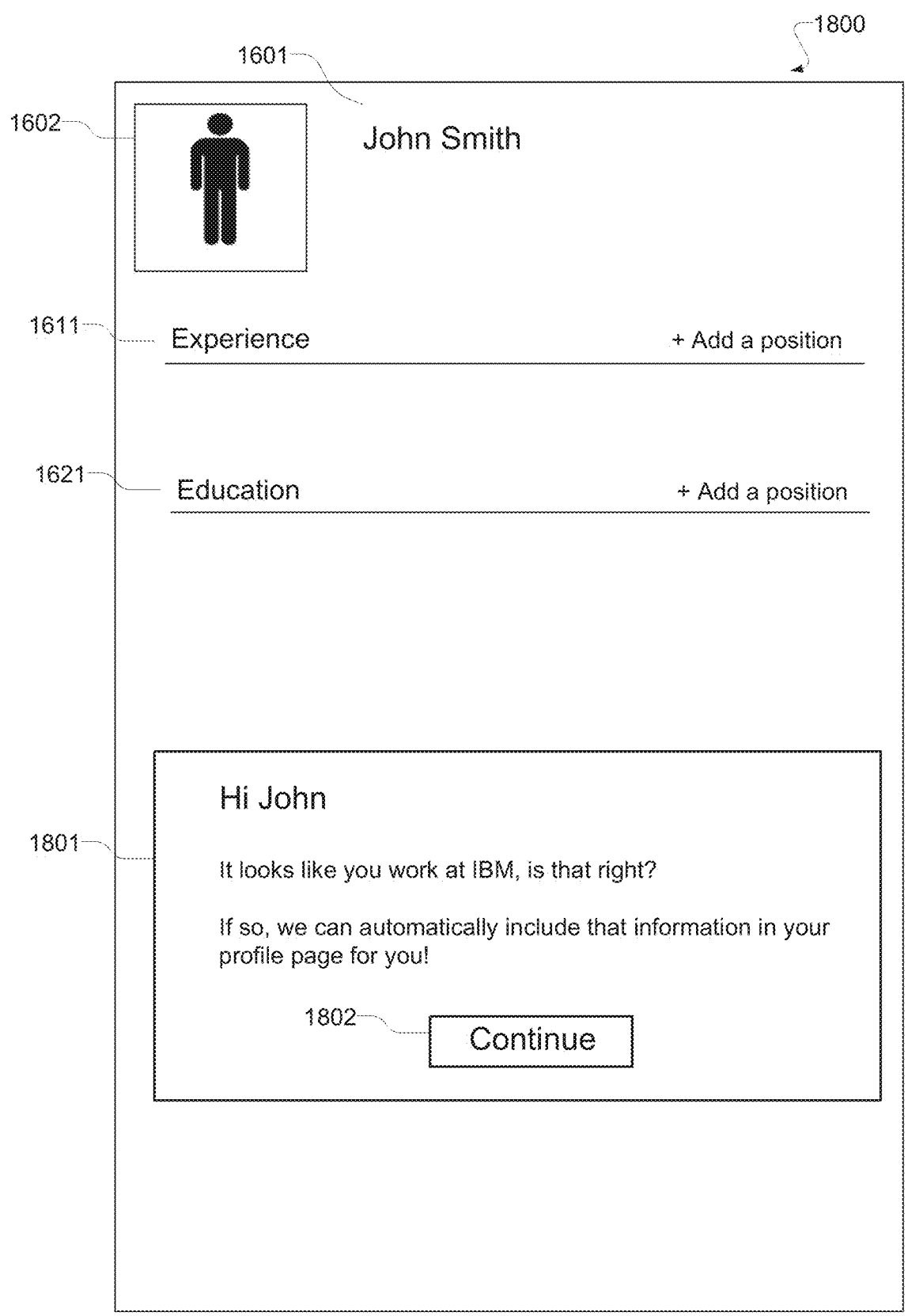
FIG. 18 illustrates an example of a prompt, according to various embodiments.

Referring back to FIG. 15, in 1503, the profile modification module 204 generates a display, via a user interface in a device, of a prompt that invites the member to update the member profile field of the member profile page, based on the inferred member profile attribute (that were inferred in 1502). For example, FIG. 18 illustrates a member profile page 1800 of the member John Smith, similar to the member profile page 1600 illustrated in FIG. 16. As illustrated in FIG. 18, the profile modification module 204 has generated a display of a prompt 1801 that informs the member John Smith of an inferred or predicted member profile attribute (e.g., experience position associated with the experience field 1611), and invites the member John Smith to update their member profile page 1800 based on the inferred or predicted member profile attribute.

Figure 19:
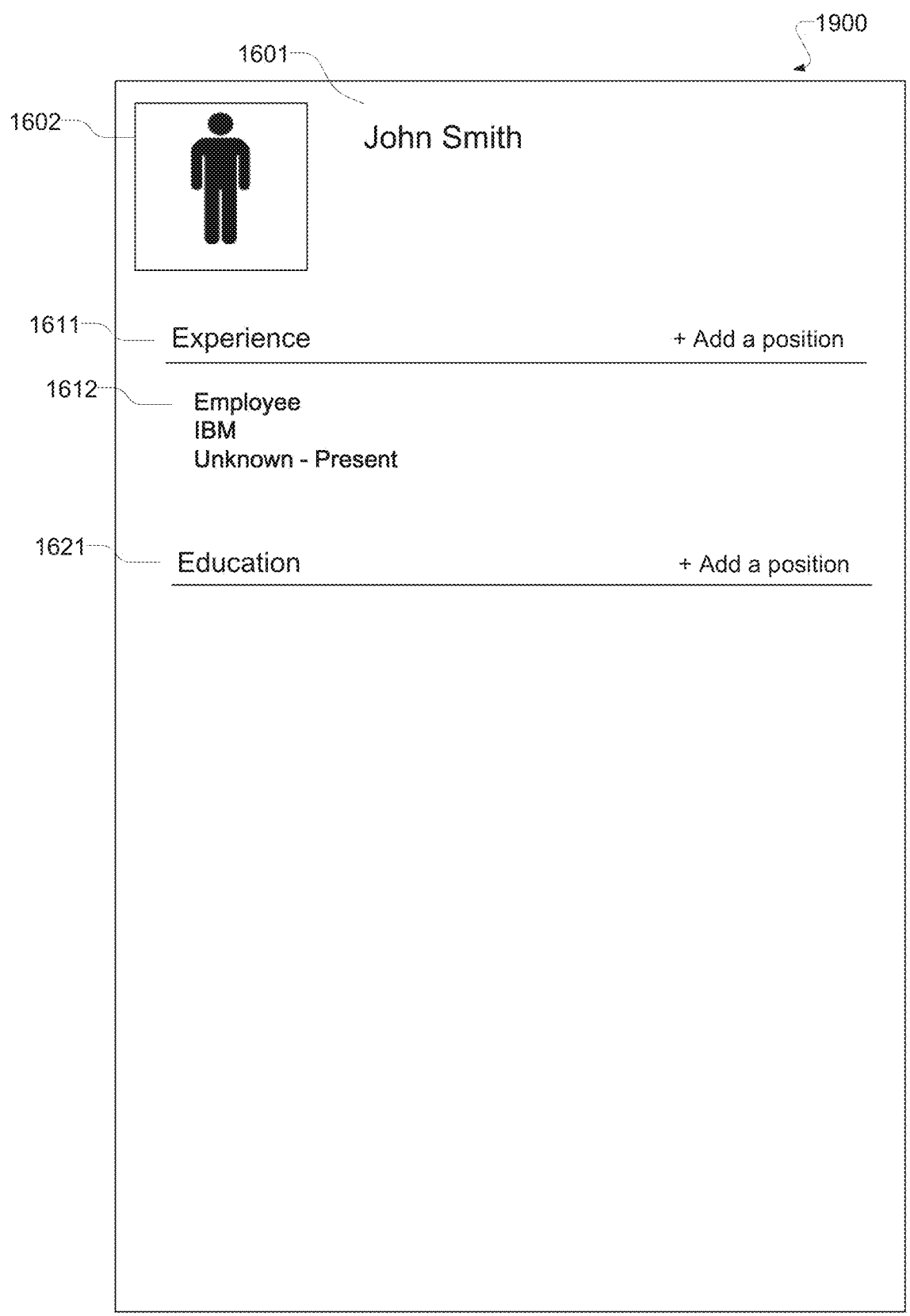
FIG. 19 illustrates an example of a member profile page, according to various exemplary embodiments.
Figure 20:
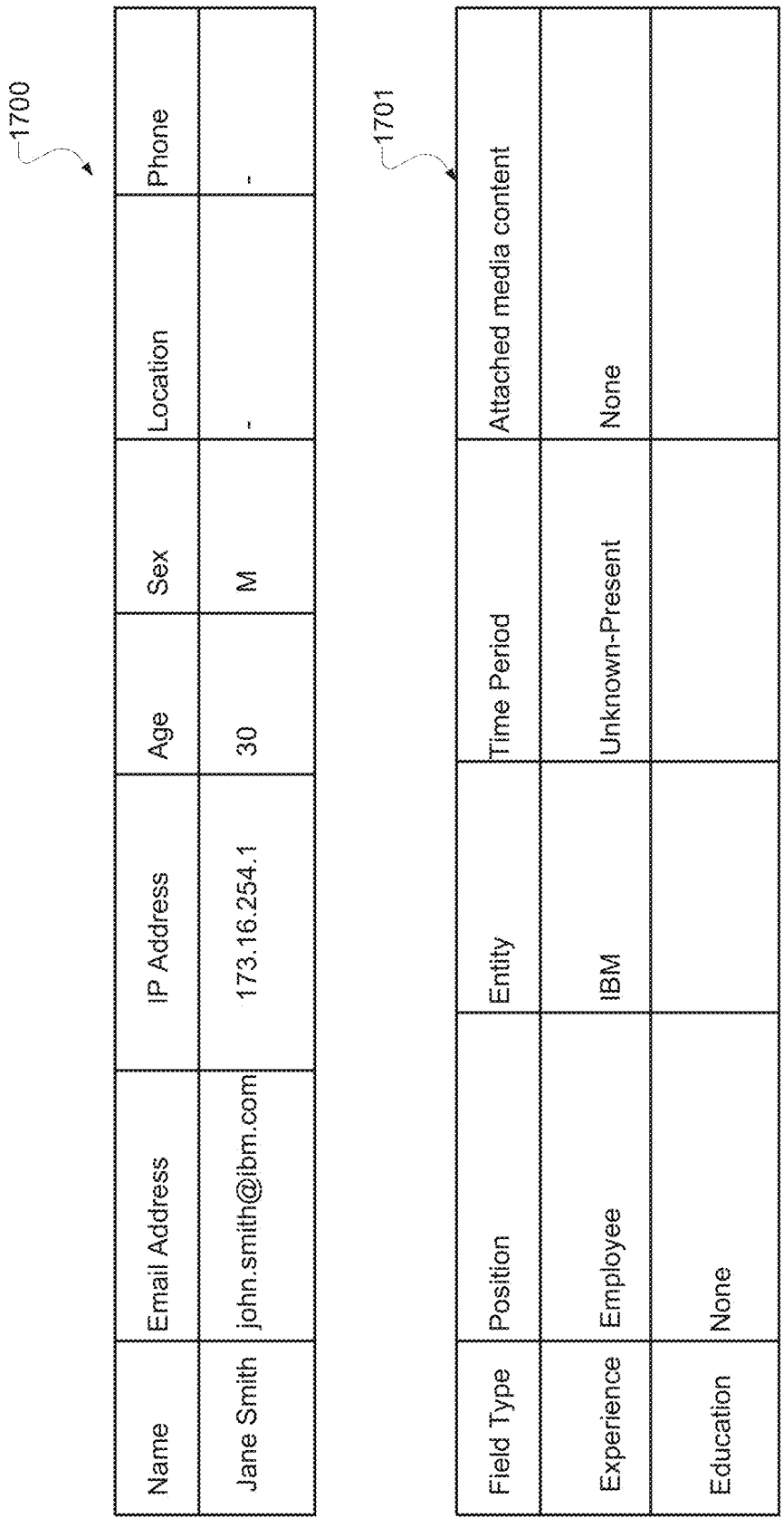
FIG. 20 illustrates an example of member profile data, according to various embodiments.

In 1504 in FIG. 15, the profile modification module 204 receives a request to update a member profile field of the member profile page, based on the predicted member profile attribute. For example, the profile modification module 204 may detect that the member John Smith has selected the continue button 1802 of the prompt 1801 displayed in FIG. 18. In 1505, the profile modification module 204 includes the member profile attribute (inferred in 1502) in the appropriate member profile field. For example, FIG. 19 illustrates an example of a member profile page 1800 similar to the member profile page 1600 illustrated in FIG. 16. As illustrated in FIG. 19, the experience field 1611 has been modified to include an experience listing 1612 corresponding to the inferred member profile attribute (e.g., an experience position of an employee at IBM). Moreover, the profile modification module 204 may modify the associated member profile data to reflect the inferred member profile attribute. For example, FIG. 20 illustrates the member profile data 1700 and 1701 illustrated in FIG. 17, except that the member profile data has been modified to reflect the inferred member profile attribute (which was inferred in 1502).

According to various exemplary embodiments, once the system 200 infers member profile attributes such as education position or experience position, the identification module 202 may access business websites and directories associated with those education and experience positions, in order to determine further information about the member for inclusion into their member profile page. For example, if the identification module 202 infers that the member is an employee at a law firm or medical practice, then the identification module 202 may access the website of the law firm or medical practice to obtain an online biography of the member. Information from this online biography may then be included in the member's profile page by the profile modification module 204.

According to various exemplary embodiments, there is provided a method performed by one or more processors, the method comprising: accessing one or more known member profile attributes included in member profile data corresponding to a member of a social network service, the social network service hosting a member profile page generated based on the member profile data; determining, based on the known member profile attributes, a predicted member profile attribute associated with a member profile field in the member profile page; and generating a display, via a user interface in a device, of a prompt that invites the member to update the member profile field of the member profile page, based on the predicted member profile attribute. According to various exemplary embodiments, the determining comprises: accessing comparative member profile data of a plurality of other members having similar member profile attributes to the known member profile attributes; and determining the one or more predicted member profile attributes, based on the comparative member profile data.

According to various exemplary embodiments, the method further comprises: receiving a request to update the member profile field of the member profile page, based on the predicted member profile attribute; and including the member profile attribute in the member profile field. According to various exemplary embodiments, the known member profile attribute is an email address of the member, and the predicted member profile attribute is an employer associated with a professional experience field. According to various exemplary embodiments, the known member profile attribute is an email address of the member, and the predicted member profile attribute is an educational institution associated with an education field. According to various exemplary embodiments, the known member profile attribute is an IP address assigned to a device associated with a member, and the predicted member profile attribute is a location. According to various exemplary embodiments, the known member profile attribute is a description of an experience position, and the predicted member profile attribute is a skill. According to various exemplary embodiments, the known member profile attribute is a skill, and the predicted member profile attribute is a description of an experience position.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 21:
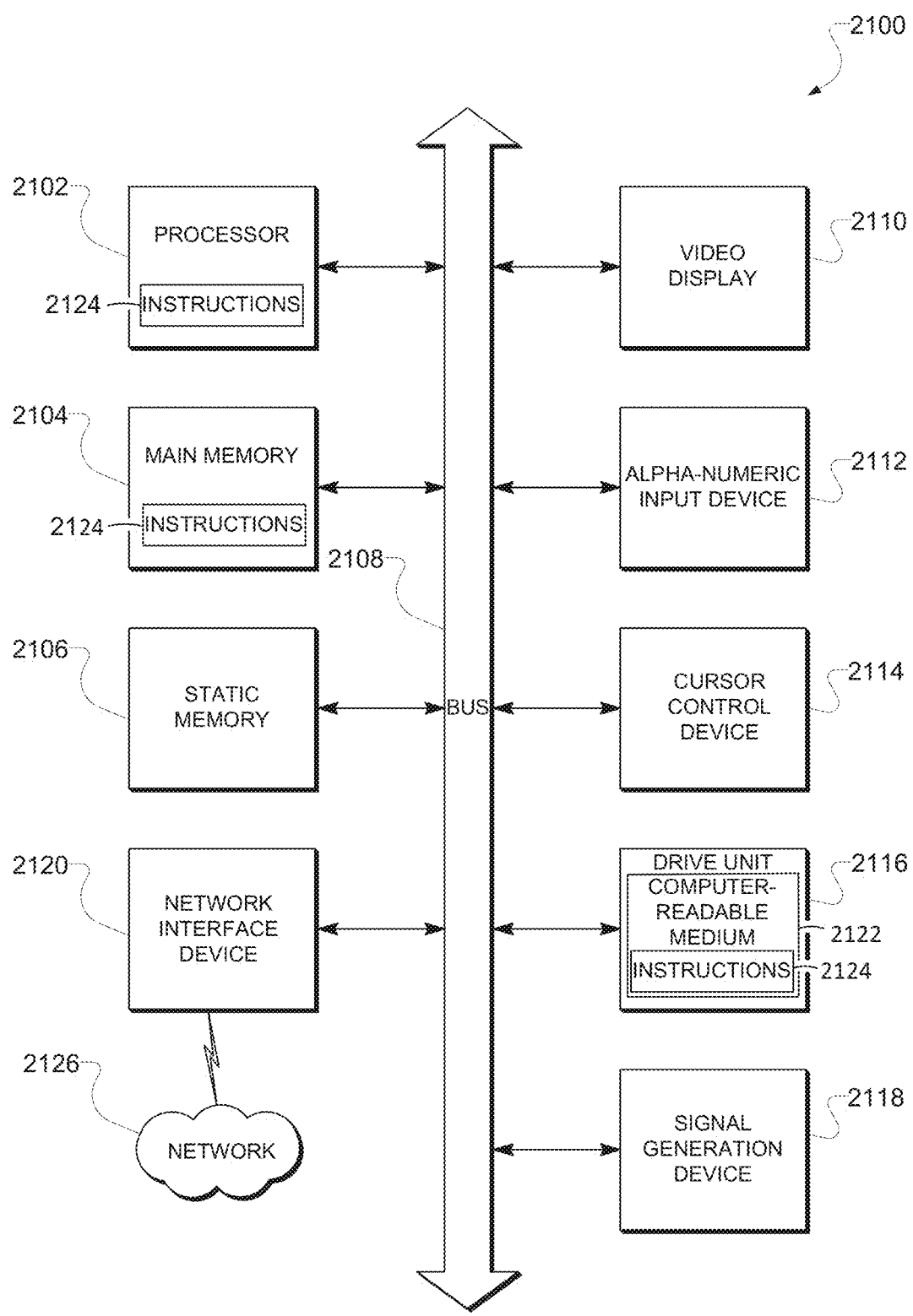
FIG. 21 is a diagrammatic representation of a machine in the example form of a computer system within which a set of instructions, for causing the machine to perform any one or more of the methodologies discussed herein, may be executed.

FIG. 21 is a block diagram of machine in the example form of a computer system 2100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard or a touch-sensitive display screen), a user interface (UI) navigation device 2114 (e.g., a mouse), a disk drive unit 2116, a signal generation device 2118 (e.g., a speaker) and a network interface device 2120.

Machine-Readable Medium

The disk drive unit 2116 includes a machine-readable medium 2122 on which is stored one or more sets of instructions and data structures (e.g., software) 2124 embodying or utilized by any one or more of the methodologies or functions described herein. The instructions 2124 may also reside, completely or at least partially, within the main memory 2104 and/or within the processor 2102 during execution thereof by the computer system 2100, the main memory 2104 and the processor 2102 also constituting machine-readable media.

While the machine-readable medium 2122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2124 may further be transmitted or received over a communications network 2126 using a transmission medium. The instructions 2124 may be transmitted using the network interface device 2120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:

extracting member profile attributes from member profile data associated with a member of a social network service;

identifying professional identity content associated with the member by searching content of at least one predetermined website provided by a provider different than a provider of the social network service to match the content of the at least one predetermined web site with one or more of the extracted member profile attributes and that associates the member to a profession, wherein the professional identity content comprises information authored by the member;

based on the identified professional identity content, causing, by a machine having a memory and at least one processor, a display of a first prompt that invites the member to update a member profile page associated with the member to include the professional identity content, wherein:

the first prompt is superimposed over the member profile page; and the first prompt includes a representation of at least a portion of the identified professional identity content; and in response to the first prompt, receiving a selection to update the member profile page with the professional identity content, wherein the update of the member profile page includes:

causing a second prompt to be displayed that requests that the member provide authentication credentials associated with the at least one predetermined website: and receiving authentication credentials associated with the at least one predetermined website for retrieving the professional identity content.

2. The method of claim 1, further comprising:

receiving a request to include the professional identity content in the member profile page; and including the professional identity content in the member profile page.

3. The method of claim 1, wherein the professional identity content corresponds to at least one of multimedia work product content, professional certification information, professional registration information, professional award information, article publication information, blog information, and presentation information.

4. The method of claim 1, wherein the member profile attributes correspond to at least one of: a name of the member; an email address of the member; an IP address associated with the member; a gender of the member; and age of the member; a professional experience position of the member; an education position of the member; a skill of the member; and a location of the member.

5. The method of claim 1, wherein identifying the professional identity content further comprises searching for webpages that include content that matches the member profile attributes.

6. The method of claim 5, wherein the identifying further comprises:
accessing professional content website information indicating that a specific set of professional content websites are associated with a specific one of the member profile attributes, the specific member profile attribute corresponding to a professional experience position, an education position, or a skill.

7. The method of claim 6, wherein the network search is performed on the specific set of professional content websites.

8. The method of claim 1, wherein the first prompt includes a reference link to a member profile completion webpage that includes instructions for updating the member profile page to include the professional identity content.

9. A system comprising:
a non-transitory, machine-readable medium having computer-executable instructions stored thereon; and
one or more hardware processors in communication with the non-transitory, machine-readable medium that, having executed the computer-executable instructions, configure the system to:
identify professional identity content associated with a member of a social network service, the identifying including extracting member profile attributes from member profile data associated with the member and searching for professional identity content of at least one predetermined website provided by a provider different than a provider of the social network service, where the identifying further includes searching the professional identity content for professional content attributes that match the extracted member profile attributes included in the member profile data associated with the member and that associates the member to a profession;
cause a display, based on the identified professional identity content, of a first prompt that invites the member to update a member profile page associated with the member to include the professional identity content, wherein:
the first prompt is superimposed over the member profile page; and
the first prompt includes a representation of at least a portion of the identified professional identity content; and
in response to the first prompt, receive a selection to update the member profile page with the professional identity content wherein the update of the member profile page includes:
causing a second prompt to be displayed that requests that the member provide authentication credentials associated with the at least one predetermined website; and
receiving authentication credentials associated with the at least one predetermined website for retrieving the professional identity content.

10. The system of claim 9, wherein the system is further configured to:
receive a request to include the professional identity content in the member profile page; and
include the professional identity content in the member profile page.

11. The system of claim 9, wherein the professional identity content corresponds to at least one of multimedia work product content, professional certification information, professional registration information, professional award information, article publication information, blog information, and presentation information.

12. The system of claim 9, wherein the member profile attributes correspond to at least one of: a name of the member; an email address of the member; an IP address associated with the member; a gender of the member; and age of the member; a professional experience position of the member; an education position of the member; a skill of the member; and a location of the member.

13. The system of claim 9, wherein identifying the professional identity content further comprises searching for webpages that include content that matches the member profile attributes.

14. The system of claim 13, wherein the identifying further comprises:
accessing professional content website information indicating that a specific set of professional content websites are associated with a specific one of the member profile attributes, the specific member profile attribute corresponding to a professional experience position, an education position, or a skill.

15. The system of claim 14, wherein the network search is performed on the specific set of professional content websites.

16. The system of claim 9, wherein the first prompt includes a reference link to a member profile completion webpage that includes instructions for updating the member profile page to include the professional identity content.

17. A non-transitory machine-readable storage medium having embodied thereon instructions executable by one or more machines to perform operations comprising:
identifying professional identity content associated with a member of a social network service, the identifying including extracting member profile attributes from member profile data associated with the member and searching for professional identity content of at least one predetermined website provided by a provided different than a provider of the social network service, where the identifying further includes searching the professional identity content for professional identity content attributes that match the extracted member profile attributes included in the member profile data associated with the member and that associates the member to a profession, wherein the professional identity content comprises information authored by the member;
based on the identified professional identity content, generating, by a machine having a memory and at least one processor, a display of a first prompt that invites the member to update a member profile page associated with the member to include the professional identity content, wherein:
the first prompt is superimposed over the member profile page; and
the first prompt includes a representation of at least a portion of the identified professional identity content; and
in response to the first prompt, receiving a selection to update the member profile page with the professional identity content wherein the update of the member profile page includes:

causing a second prompt to be displayed that requests that the member provide authentication credentials associated with the at least one predetermined website; and receiving authentication credentials associated with the at least one predetermined website for retrieving the professional identity content.

18. The non-transitory machine-readable storage medium of claim 17, wherein the operations further comprise:

receiving a request to include the professional identity content in the member profile page; and including the professional identity content in the member profile page.

19. The non-transitory machine-readable storage medium of claim 17, wherein the professional identity content corresponds to at least one of multimedia work product content, professional certification information, professional registration information, professional award information, article publication information, blog information, and presentation information.

20. The non-transitory machine-readable storage medium of claim 17, wherein the member profile attributes correspond to at least one of: a name of the member; an email address of the member; an IP address associated with the member; a gender of the member; and age of the member; a professional experience position of the member; an education position of the member; a skill of the member; and a location of the member.

* * * * *

UNITED STATES PATENT AND TRADEMARK OFFICE
CERTIFICATE OF CORRECTION

PATENT NO. : 10,681,168 B2
APPLICATION NO. : 14/193220
DATED : June 9, 2020
INVENTOR(S) : Berger et al.

Page 1 of 1

It is certified that error appears in the above-identified patent and that said Letters Patent is hereby corrected as shown below:

In the Claims

In Column 22, Line 25, in Claim 1, delete "web site" and insert --website-- therefor In Column 22, Lines 47-48, in Claim 1, delete "website:" and insert --website;-- therefor In Column 23, Line 55, in Claim 9, delete "content" and insert --content,-- therefor In Column 24, Line 66, in Claim 17, delete "content" and insert --content,-- therefor Signed and Sealed this
Second Day of November, 2021

Drew Hirshfeld
*Performing the Functions and Duties of the*
*Under Secretary of Commerce for Intellectual Property and*
*Director of the United States Patent and Trademark Office*